(12) United States Patent
Neiser et al.

(10) Patent No.: US 9,037,290 B2
(45) Date of Patent: May 19, 2015

(54) ACCUMULATION CONTROL

(71) Applicant: INTELLIGRATED HEADQUARTERS LLC, Mason, OH (US)

(72) Inventors: Raymond R. Neiser, Batavia, OH (US); Jason A. Johnson, Hamilton, OH (US); Brian J. Resnick, West Chester, OH (US); Christopher Scott Anderson, West Harrison, IN (US); Kevin L. Klueber, Hamilton, OH (US); Matthew Ross Wicks, St. Charles, MI (US); Richard L. Kerns, Mason, OH (US)

(73) Assignee: INTELLIGRATED HEADQUARTERS LLC, Mason, OH (US)

( * ) Notice: Subject to any disclaimer, the term of this patent is extended or adjusted under 35 U.S.C. 154(b) by 12 days.

(21) Appl. No.: 14/090,027

(22) Filed: Nov. 26, 2013

(65) Prior Publication Data

US 2014/0156063 A1    Jun. 5, 2014

Related U.S. Application Data

(60) Provisional application No. 61/732,235, filed on Nov. 30, 2012, provisional application No. 61/754,969, filed on Jan. 21, 2013, provisional application No. 61/754,971, filed on Jan. 22, 2013.

(51) Int. Cl.
    *G06F 7/00*      (2006.01)
    *B65G 43/10*    (2006.01)
(52) U.S. Cl.
    CPC ..................................... *B65G 43/10* (2013.01)
(58) Field of Classification Search
    USPC .......................................................... 700/230
    See application file for complete search history.

(56) References Cited

U.S. PATENT DOCUMENTS

| 790,779 A | 5/1905 | Alvey |
| 883,297 A | 3/1908 | Courtney |

(Continued)

FOREIGN PATENT DOCUMENTS

| EP | 2522602 A1 | 11/2012 |
| FR | 2530590 A1 | 1/1984 |

(Continued)

OTHER PUBLICATIONS

International Search Report and Written Opinion mailed Mar. 5, 2014 for International Application No. PCT/US2013/072532.

(Continued)

*Primary Examiner* — Gene Crawford
*Assistant Examiner* — Kyle Logan
(74) *Attorney, Agent, or Firm* — The Marbury Law Group, PLLC

(57) ABSTRACT

Systems, methods, devices, and non-transitory processor readable media of the various embodiments enable control of a conveyor having a plurality of zones each having a control module configured to control a selectable speed of the zone. The various embodiments are disclosed in connection with, but not necessarily limited to, accumulation conveyors with control systems which selectively set the speeds of zones based on conditions of upstream and downstream zones. The various embodiments are directed to improving efficiency of accumulation systems by controlling zones based upon consideration of conditions of neighboring zones. The various embodiment also enable the generation and use of translation tables correlating zones with network addresses of their respective control modules.

15 Claims, 13 Drawing Sheets

(56) References Cited

U.S. PATENT DOCUMENTS

| | | | |
|---|---|---|---|
| 958,004 A | 5/1910 | Phelan | |
| 1,890,753 A | 12/1932 | Scheurer | |
| 2,100,423 A | 11/1937 | Ziegler | |
| 2,145,475 A | 1/1939 | Cook | |
| 2,834,447 A | 5/1958 | Gmur | |
| 3,101,829 A | 8/1963 | Silver | |
| 3,532,201 A | 10/1970 | McConnell | |
| 3,960,262 A | 6/1976 | Henig | |
| 4,088,224 A | 5/1978 | Kittredge | |
| 4,103,769 A | 8/1978 | Jorgensen | |
| 4,108,303 A | 8/1978 | Vogt et al. | |
| 4,109,783 A | 8/1978 | Vogt | |
| 4,293,065 A | 10/1981 | Dyer et al. | |
| 4,383,605 A | 5/1983 | Harwick | |
| 4,441,607 A | 4/1984 | Bowman et al. | |
| 4,453,627 A | 6/1984 | Wilkins | |
| 4,473,149 A | 9/1984 | Vogt et al. | |
| 4,721,203 A | 1/1988 | Kimball et al. | |
| 5,033,600 A | 7/1991 | Klein | |
| 5,070,987 A | 12/1991 | Koltookian | |
| 5,086,910 A | 2/1992 | Terpstra | |
| 5,213,189 A | 5/1993 | Agnoff | |
| 5,228,558 A | 7/1993 | Hali | |
| 5,375,689 A | 12/1994 | Sapp et al. | |
| 5,375,696 A | 12/1994 | Collins et al. | |
| 5,456,347 A | 10/1995 | Best et al. | |
| 5,490,587 A | 2/1996 | Fisher | |
| 5,540,323 A | 7/1996 | Schiesser et al. | |
| 5,562,195 A | 10/1996 | Isaacs | |
| 5,642,799 A | 7/1997 | Wassilow | |
| 5,823,319 A | 10/1998 | Resnick et al. | |
| 5,862,907 A | 1/1999 | Taylor | |
| 5,901,827 A | 5/1999 | Belz et al. | |
| 5,984,498 A * | 11/1999 | Lem et al. | 700/2 |
| 6,065,588 A | 5/2000 | Cotter et al. | |
| 6,315,104 B1 | 11/2001 | Ebert | |
| 6,405,851 B1 | 6/2002 | Takeda | |
| 6,478,142 B2 | 11/2002 | Cotter et al. | |
| 6,827,202 B2 | 12/2004 | Topmiller et al. | |
| 6,843,362 B2 * | 1/2005 | Tachibana et al. | 198/460.1 |
| 6,860,381 B2 | 3/2005 | Newsom et al. | |
| 6,889,822 B1 | 5/2005 | Wagner et al. | |
| 7,360,638 B2 | 4/2008 | Ko et al. | |
| 2003/0168316 A1 | 9/2003 | Knepple | |
| 2003/0195671 A2 * | 10/2003 | Horst et al. | 701/2 |
| 2006/0212163 A1 * | 9/2006 | Ko et al. | 700/213 |
| 2006/0289279 A1 | 12/2006 | Taylor | |
| 2007/0119690 A1 | 5/2007 | Lupton | |
| 2012/0290126 A1 | 11/2012 | Combs et al. | |
| 2013/0013114 A1 * | 1/2013 | Magato et al. | 700/275 |

FOREIGN PATENT DOCUMENTS

| | | |
|---|---|---|
| JP | 04-201917 | 7/1992 |
| JP | 05-155411 | 6/1993 |
| JP | 09002647 A | 1/1997 |
| JP | 2002-226031 | 8/2002 |
| JP | 2002-240926 | 8/2002 |
| JP | 2003221112 | 8/2003 |
| JP | 2003292140 | 10/2003 |

OTHER PUBLICATIONS

International Search Report and Written Opinion for International Application No. PCT/US2013/071954 mailed Mar. 4, 2014.
International Search Report and Written Opinion mailed Mar. 4, 2014 for International Application No. PCT/US2013/071954.
International Search Report and Written Opinion dated Sep. 21, 2010 for Application No. PCT/US2010/027983.

* cited by examiner

ACCUMULATION CONTROL

CROSS REFERENCE TO RELATED APPLICATIONS

This application claims the benefit of priority to U.S. Provisional Patent Application No. 61/732,235, filed on Nov. 30, 2012; U.S. Provisional Patent Application No. 61/754,969, filed on Jan. 21, 2013; and U.S. Provisional Patent Application No. 61/754,971, filed on Jan. 22, 2013. The entire contents of all three of those applications are hereby incorporated by reference in their entireties.

FIELD

The present disclosure relates generally to material handling systems, and is more particularly directed to a system which provides efficient accumulation of articles.

BACKGROUND

In material handling systems, accumulation of articles into groups, often called slugs or trains, reduces delays in material handling by temporarily stopping or holding articles and then releasing them in coordination with other subsystems of the material handling system, including, for example, other accumulators. Improving the efficiency of an accumulation system can improve the material handling performance by improving accuracy and throughput.

SUMMARY

The systems, methods, devices, and non-transitory processor readable media of the various embodiments enable control of a conveyor having a plurality of zones each having a control module configured to control a selectable speed of the zone. The various embodiments are disclosed in connection with, but not necessarily limited to, accumulation conveyors with control systems which selectively set the speeds of zones based on conditions of upstream and downstream zones. The various embodiments are directed to improving efficiency of accumulation systems by controlling zones based upon consideration of conditions of neighboring zones. The various embodiment also enable the generation and use of translation tables correlating zones with network addresses of their respective control modules.

BRIEF DESCRIPTION OF THE DRAWINGS

The accompanying drawings illustrate embodiments of the invention, and, together with specification, including the general description above and the detailed description which follows, serve to explain the features of the present invention.

DETAILED DESCRIPTION

Figure 1A:
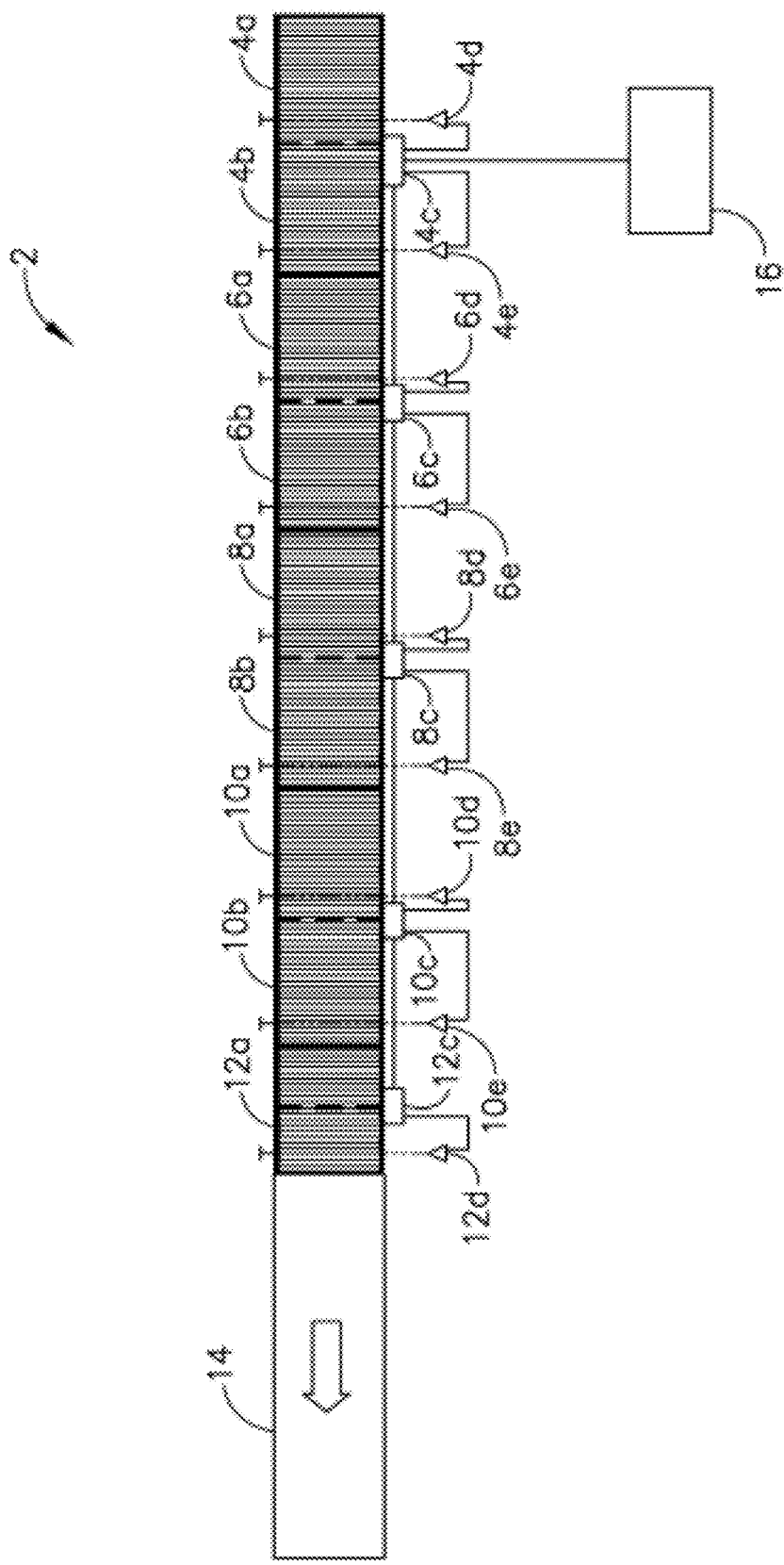
FIG. 1A is a diagrammatic plan view of an accumulation conveyor.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "zones" is used herein to mean sections of a material handling system which may be controlled as a unit. An example of a zone may be a set of rollers on a conveyor which may all operate with the same speed and may be accelerated and/or decelerated as a group.

U.S. patent application Ser. No. 12/727,634, filed on Mar. 19, 2010 entitle "Zoned Accumulation Conveyor" is hereby incorporated by reference in its entirety. Referring to FIG. 1, there is shown a diagrammatic plan view of an accumulation conveyor suitable for use with the various embodiments. Accumulation conveyor, generally indicated at 2, includes a plurality of individually controllable zones 4a, 4b, 6a, 6b, 8a, 8b, 10a, 10b and 12a. Although in the embodiment depicted in FIG. 1 there are nine zones, the present invention is not limited to nine zones, or an odd or even number of zones. In the embodiment depicted, zones are generally three feet long, although they may be of any suitable length, such as six feet. In the embodiment depicted, zone control modules 4c, 6c, 8c and 10c each control two zones, although a zone control module may control more than two zones or control only one zone, such as control module 12c which controls zone 12a, the discharge zone, which discharges to conveyor 14. The number of zones that a single zone control module may control is not limited.

In an accumulation conveyor 2, such as shown in FIG. 1, each zone may be selectively driven in any suitable manner as is known in the art, such as for example, by the drive arrangement shown in U.S. Pat. No. 6,889,822, the disclosure of which is hereby incorporated by reference in its entirety. The speed of each zone is selectively controlled by being set within a range between and including a maximum speed and a minimum speed. As used herein, minimum speed includes, but is not limited to, a speed of zero. The zone speeds may be controlled in any suitable manner, such as for example, by the variable speed control system of U.S. Pat. No. 5,823,319, the disclosure of which is hereby incorporated by reference in its entirety. That variable speed control system utilizes pulse width modulation control applied to selectively transfer power from a common drive element serving multiple zones of a single accumulation conveyor to rollers of a zone. Pulse width modulation in this case involves driving the zone either at full speed or not driving the zone, and controlling the duty cycle (the length of time that the zone is driven at full speed during a predetermined period of time) to produce an effective speed—the average of instantaneous speeds over the duty cycle. For example, a 100% duty cycle results in an effective speed equal to the maximum zone speed (resulting from the maximum speed of the drive element accounting for inefficiencies such as slippage, friction, inertia, etc.). A 0% duty cycle results in an effective speed of zero. Zones may be driven by a drive arrangement which is capable of controlling the speed without modulation, producing a constant speed which is the effective speed.

As an example, each zone of accumulation conveyor 2 may comprise a plurality of conveyor rollers defining a conveying surface, which may be selectively driven such as by an underlying chain or a drive belt (not shown) urged against the conveyor rollers using pneumatic actuators (not shown). Each control module 4c, 6c, 8c, 10c and 12c may be configured to urge a chain or drive belt against the conveyor rollers using pneumatic actuators (not shown) of their associated zones, and may preferably be connected to a pneumatic source. The control modules 4c, 6c, 8c, 10c and 12c may be pneumatically daisy chained together. Other drive arrangements may include motorized drive rollers, with control modules 4c, 6c, 8c, 10c and 12c configured appropriately to control the motorized drive rollers.

In the accumulation conveyor 2 depicted in FIG. 1A, each zone 4a, 4b, 6a, 6b, 8a, 8b, 10a, 10b and 12a may include respective sensors 4d, 4e, 6d, 6e, 8d, 8e, 10d, 10e and 12d that may be connected to the respective zones' control modules 4c, 6c, 8c, 10c and 12c. As an example, the sensors 4d, 4e, 6d, 6e, 8d, 8e, 10d, 10e and 12d may be photo eyes with respective reflectors, although any suitable sensor may be used, such as roller sensors or diffused scan sensors. The positions and orientations of the sensors 4d, 4e, 6d, 6e, 8d, 8e, 10d, 10e and 12d, also referred to herein as photo eyes, within the zones may be selected based on the system parameters, such as length or type of packages to be moved by the accumulation conveyor 2. Although FIG. 1A is a diagrammatic illustration, sensors 4d, 4e, 6d, 6e, 8d, 8e, 10d, 10e and 12d are depicted as proximal the discharge end of each zone, such as about one foot from the discharge. Any suitable location may be used, such as proximal the feed end of each zone.

In the embodiment depicted, control modules 4c, 6c, 8c, 10c and 12c are networked together with controller 16. Although a daisy chain configuration is depicted, any suitable network configuration may be used. As used herein, a daisy chain configuration may be a network configuration in which networked devices are connected in series with each other such that messages are passed successively from one network device to the next to transit the network. For example, in a daisy chain network, messages from a first device in the series of connected devices to the last device in the series of connected devices may pass through all intermediate devices. In contrast, in a network that is not daisy chained, such as a spoke and hub type network, devices may be connected in parallel to central hubs such that a message from a device may be sent to the hub which may route message to another connected device without necessarily having to route the message through another intermediate device.

Controller 16, which may have one or more processors, comprises at least part of a processing system which executes instructions to control accumulation conveyor 2. In the embodiment depicted, logic for control of accumulation conveyor 2 may be resident on controller 16, which executes instructions that implement the control logic. For example, the processor of controller 16 may be configured with processor-executable instructions to perform operations to control the accumulation conveyor 2 and its various zones. Controller 16 may control more than one accumulation conveyor line. Control modules 4c, 6c, 8c, 10c and 12c may be Input/Output ("I/O") based. For example, an EtherCAT network may be used to provide the high speed communication necessary for controlling the zones 4a, 4b, 6a, 6b, 8a, 8b, 10a, 10b and 12a. The various embodiments may not be constrained to a certain I/O scheme, networking methodology, architecture, or centralized processing. Alternatively, control modules 4c, 6c, 8c, 10c and 12c could be devices with I/O and processing capability such, as a programmable logic control, in which case a separate controller 16 might not be provided.

In the embodiment depicted, controller 16 executes instructions to implement the control logic of an embodiment of the present invention. The supervisory interface to controller 16 may be as simple as discrete inputs and outputs for flow control devices (e.g., switches, sensors, solenoid valves, etc.) or as advanced as commands from one or more other processing systems.

Figure 1B:
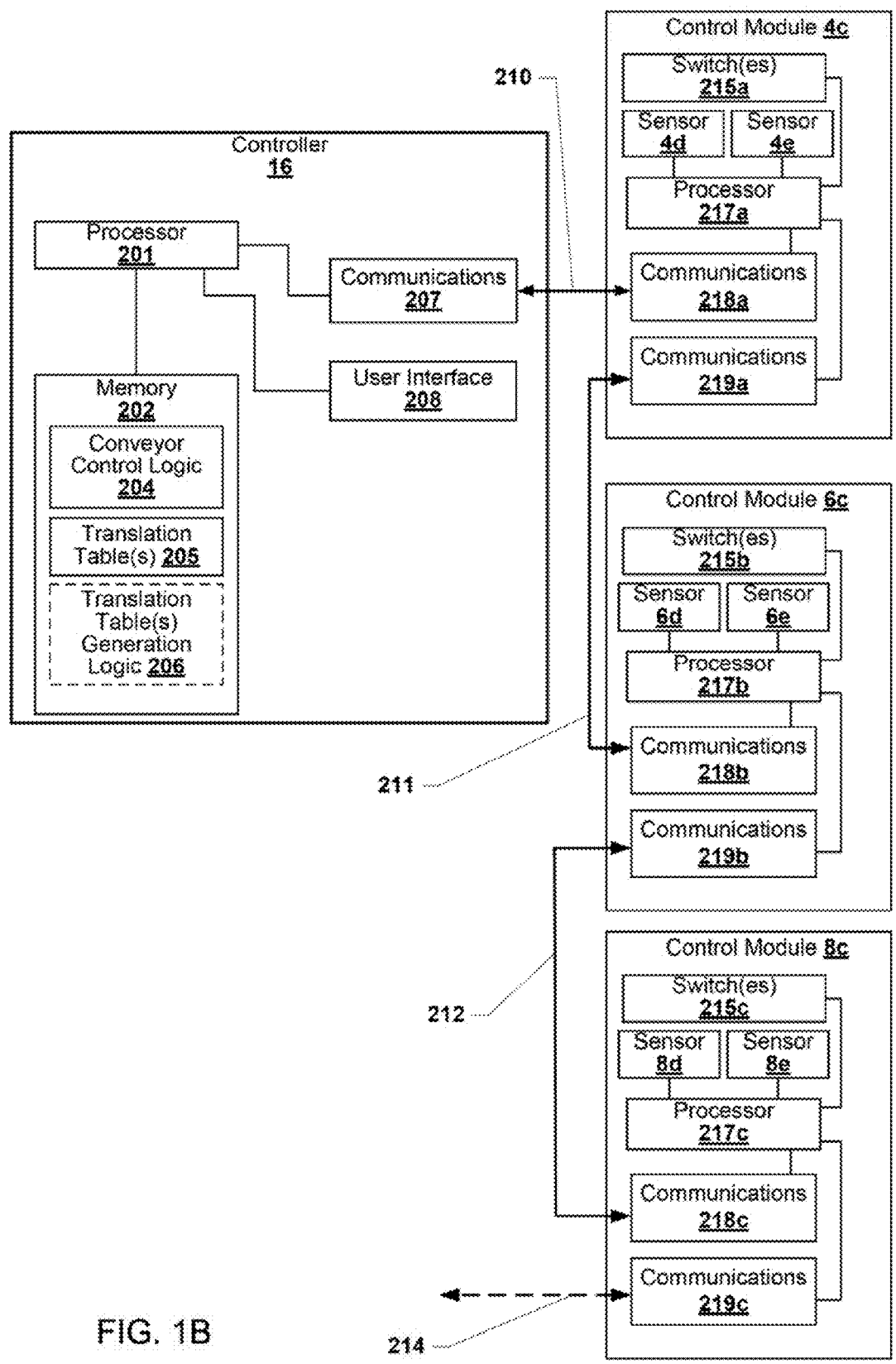
FIG. 1B illustrates a schematic block diagram of a controller and control modules of a conveyor according to an embodiment.

FIG. 1B illustrates elements of controller 16 and control modules 4c, 6c, and 8c according to an embodiment. While only three control modules 4c, 6c, and 8c are illustrated in FIG. 1B, additional control modules may be further connected in series with control module 8c to form larger daisy chain networks as required to control additional zones of one or more conveyors.

Controller 16 may include at least one processor 201 that may be connected to a user interface 208, memory 202, and communications component 207. The memory 202 may be for storing local versions of applications being executed by the processor 201. The processor 201 may be configured to execute or otherwise process functions associated with one or more of components and functions described herein and may exchange data and/or otherwise communicate with the communications component 207, user interface 208, memory 202, and any other components of the controller 16. In various embodiments, the processor 201 may include a single or multiple set of processors or multi-core processors, or alternatively, may be implemented as an integrated processing system and/or a distributed processing system. The memory 202 may include any type of memory usable by a computer, such as random access memory (RAM), read only memory (ROM), tapes, magnetic discs, optical discs, volatile memory, non-volatile memory, and any combination thereof.

The communications component 207 may establish and maintain communications with one or more devices, such as control modules 4c, 6c, 8c, etc., utilizing hardware, software, and services as described herein. The communications component 207 may include transmit chain components and receive chain components associated with a transmitter and receiver, or a transceiver, operable for interfacing with external devices as well as communication protocol software layers, such as EtherCAT software layers, to enable exchange of messages with one or more devices, such as control modules 4c, 6c, 8c, etc.

The memory 202 may include conveyor control logic 204, such as neighborhood control logic described herein, to control the operations of one or more zones of one or more conveyors. In an embodiment, the conveyor control logic may be agnostic to the type and/or configuration of the control hardware, such as control modules 4c, 6c, 8c, etc., used to control the zones of the one or more conveyors. The conveyor control logic 204 may merely make determinations based on an identifier of the zone and output conveyor control command(s) (e.g., command(s) indicating a speed setting for one or more zones) including the zone identifier(s) of the intended zone(s) for the command(s). To route the commands to the actual control module controlling the intended zone, the memory 202 may include one or more translation table 205 that may correlate zone identifiers with the network address of the control module of the respective zones. In this manner, the processor 201 may execute the conveyor control logic 204 to generate a command indicating a speed setting for a zone and that zone's identifier and may then use the translation table 205 to determine the network address of the control module for the zone based on the zone's identifier. The processor 201 may then send the command indicating the speed setting for the zone to the determined network address for the control module of that zone via the communications component 207. The ability for the conveyor control logic 204 to be agnostic and operate without knowledge of the network configuration (e.g., without knowledge of network addresses) may simplify the design, revision, and troubleshooting of the conveyor control logic 204.

In an optional embodiment, the memory 202 may also include translation table generation logic 206 enabling the controller 206 to generate translation tables 205 as discussed herein. The translation table generation logic 206 may be optional because in some embodiments an external device may generate the translation tables which may be loaded into the memory 202.

The controller 16 may be connected in series to control module 4c via a wired connection 210. Wired connection 210 may be formed by a power and communication cord connection between the controller 16 and the control module 4c physically connecting the controller 16 to one side of the control module 4c. The control module 4c may include two communications components 218a and 219a each connected to a processor 217a of the control module 4c. The communications components 218a and 219a may each include their own transmit chain components and receive chain components associated with a transmitter and receiver, or a transceiver, operable for interfacing with external devices. The processor 217a may include communication protocol software layers, such as EtherCAT software layers, to enable exchange of messages via the communications components 218a and 219a. In an embodiment, the processor 217a may distinguish between messages received via the communications components 218a and 219a. For example, messages received from communications component 218a may be considered by the processor 217a to be messages for forwarding while messages received from communications component 219a may be considered by the processor 217a to be messages for processing. In an embodiment, the control module 4c may be assigned a network address itself and/or components within the control module 4c, such as sensors 4d and 4e, various switches 215a, etc., may each be assigned network addresses. Control module 4c may include sensors 4d and 4e connected to processor 217a and processor 217a may output data from the sensors 4d and 4e via communications components 218a and/or 219a. Control module 4c may include one or more switches 215a that may be controlled by the processor 217a in response to commands received via communications components 218a and/or 219a. For example, switches 215a may be switches opening and closing pneumatic vales to control air flow to a conveyor to control the selectable speed of one or more zones of a conveyor.

The control module 4c may be connected in series to control module 6c via a wired connection 211. Wired connection 211 may be formed by a power and communication cord connection between the control module 4c and the control module 6c physically connecting one side of control module 4c to one side of the control module 6c. The control module 6c may include two communications components 218b and 219b each connected to a processor 217b of the control module 6c. The communications components 218b and 219b may each include their own transmit chain components and receive chain components associated with a transmitter and receiver, or a transceiver, operable for interfacing with external devices. The processor 217b may include communication protocol software layers, such as EtherCAT software layers, to enable exchange of messages via the communications components 218b and 219b. In an embodiment, the processor 217b may distinguish between messages received via the communications components 218b and 219b. For example, messages received from communications component 218b may be considered by the processor 217b to be messages for forwarding while messages received from communications component 219b may be considered by the processor 217b to be messages for processing. In an embodiment, the control module 6c may be assigned a network address itself and/or components within the control module 6c, such as sensors 6d and 6e, various switches 215b, etc., may each be assigned network addresses. Control module 6c may include sensors 6d and 6e connected to processor 217b and processor 217b may output data from the sensors 6d and 6e via communications components 218b and/or 219b. Control module 6c may include one or more switches 215b that may be controlled by the processor 217b in response to commands received via communications components 218b and/or 219b. For example, switches 215b may be switches opening and closing pneumatic vales to control air flow to a conveyor to control the selectable speed of one or more zones of a conveyor.

The control module 6c may be connected in series to control module 8c via a wired connection 212. Wired connection 212 may be formed by a power and communication cord connection between the control module 6c and the control module 8c physically connecting one side of control module 6c to one side of the control module 8c. The control module 8c may include two communications components 218c and 219c each connected to a processor 217c of the control module 8c. The communications components 218c and 219c may each include their own transmit chain components and receive chain components associated with a transmitter and receiver, or a transceiver, operable for interfacing with external devices. The processor 217c may include communication protocol software layers, such as EtherCAT software layers, to enable exchange of messages via the communications components 218c and 219c. In an embodiment, the processor 217c may distinguish between messages received via the communications components 218c and 219c. For example, messages received from communications component 218c may be considered by the processor 217c to be messages for forwarding while messages received from communications component 219c may be considered by the processor 217c to be messages for processing. In an embodiment, the control module 8c may be assigned a network address itself and/or components within the control module 8c, such as sensors 8d and 8e, various switches 215c, etc., may each be assigned network addresses. Control module 8c may include sensors 8d and 8e connected to processor 217c and processor 217c may output data from the sensors 8d and 8e via communications components 218c and/or 219c. Control module 8c may include one or more switches 215c that may be controlled by the processor 217c in response to commands received via communications components 218c and/or 219c. For example, switches 215c may be switches opening and closing pneumatic vales to control air flow to a conveyor to control the selectable speed of one or more zones of a conveyor.

Optional wired connection 214 may further connect control module 8c to other devices. The wired connections 210, 211, and 212 between the controller 16 and control modules 4c, 6c, and 8c may form a daisy chain network between the controller 16 and control modules 4c, 6c, and 8c.

The various embodiments provide improved acceleration and deceleration control of articles transported on an accumulation conveyor of a material handling system, thereby allowing the accumulation conveyor to operate at a higher speed with a higher article density while providing gentle handling of articles at the higher speed. In the various embodiments, an appropriate effective speed for each individual zone may be selected based on one or more conditions of one or more zones downstream of an individual zone and optionally on one or more conditions of one or more zones upstream of an individual zone. As discussed herein, an individual zone being examined at a given time may be referred to when being examined as the local zone. As used herein, downstream direction is the direction articles travel on an accumulation conveyor, and upstream direction is the direction opposite of the direction articles travel on an accumulation conveyor. A downstream zone is a zone which is disposed in the downstream direction from another zone. An upstream zone is a zone which is disposed in the upstream direction from another zone. Herein for convenience, these upstream and downstream zones are referred to as a neighborhood. An upstream neighborhood and a downstream neighborhood may extend one or more zones in the particular direction. In this disclosure, the downstream neighborhood is treated as including all downstream zones, and the upstream neighborhood is treated as including all upstream zones, though it should be understood that different upstream and/or downstream neighborhood sizes could be used. For example, to reduce network traffic and processing burden, a downstream neighborhood could be defined as being limited to the two closest downstream zones and the upstream neighborhood being limited to the four closest upstream zones. The operational mode implemented by the control schemes of the various embodiments may be referred to as neighborhood mode. Neighborhood is used herein only as a label referring to the control schemes of the various embodiments and does not represent a limitation on the scope of the present invention or the claims.

Figure 2:
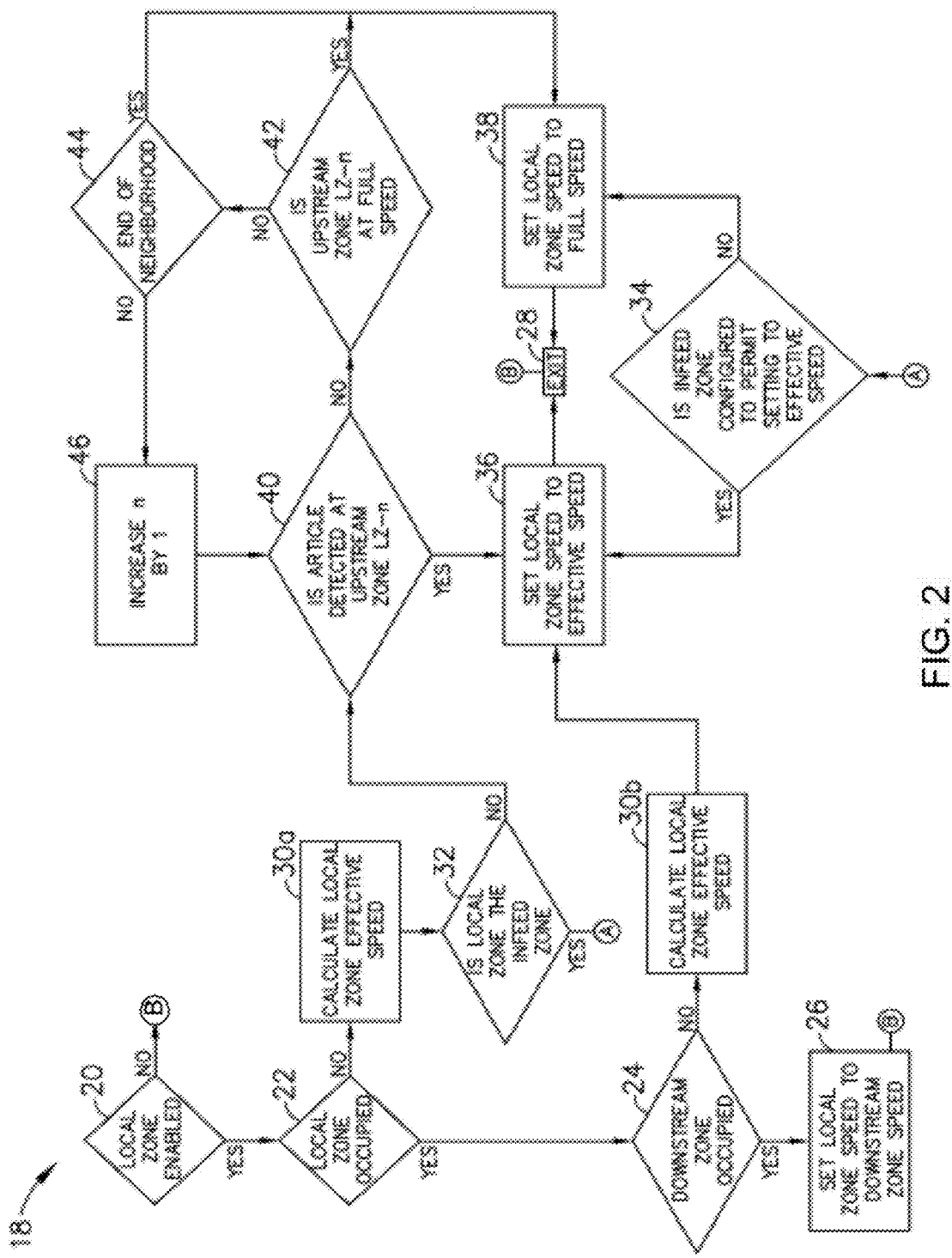
FIG. 2 is a process flow diagram illustrating an embodiment neighborhood zone control method.

Referring to FIG. 2, an embodiment method for neighborhood control of zones of a conveyor is shown. Neighborhood control functionality logic 18 may be applied to each zone of a plurality of zones of an accumulation conveyor. It is noted that there is other accumulator control logic which is executed in conjunction with any neighborhood control logic, such as the neighborhood control functionality logic 18. The zone being examined is referred to herein as the local zone and may be abbreviated LZ. Control logic 18 examines each of the plurality of zones, beginning with the zone which is furthest downstream of the plurality of zones and progressing upstream, which may be progressing consecutively upstream examining each zone, or which may be progressing sequentially upstream potentially skipping zones but still progressing in the upstream direction. In the embodiment depicted, control logic 18, begins with the discharge zone, which for example may be zone 12a of accumulation conveyor 2 of FIG. 1A, and ends with the upstream-most zone of the plurality of zones, which may be zone 4a of FIG. 1A. In an embodiment, the operations of the method illustrated in FIG. 2, may be performed by a processor of a controller.

At determination block 20 the controller may determine whether the local zone is enabled. Whether a zone is enabled may be determined based on whether the accumulation conveyor is implemented so that the zone can be energized by its local module based on instructions from the neighborhood control functionality logic 18, and on whether neighborhood mode is turned on for that zone. For example, one or more flag settings may indicate that the local module can be energized and that neighborhood mode is on, thereby indicating that the local zone is enabled. The determination of whether a zone is enabled could also be based on other types of rules of the control logic 18 controlling the accumulation modes of the zones of the accumulation conveyor. If the local zone is not enabled (i.e., determination block 20="No"), in block 28 the controller may exit examining the current local zone, and control logic 18 may then be re-executed for the next upstream zone, continuing the execution until all zones of the plurality of zones have been examined.

If the local zone is enabled (i.e., determination block 20="Yes"), in determination block 22 the controller may determine whether the local zone is considered occupied. As used herein, a zone is considered occupied when the zone's sensor has given a signal indicating detection of an article (e.g., a blocked signal from a photo eye) for a period equal to or greater than a first delay period. The first delay period could be, for example, zero, 0.75 seconds, 1.0 seconds or 1.5 seconds. A zone which is considered occupied will be considered not occupied once the sensor is cleared (e.g., a photo eye is not blocked) for a period equal to or greater than a second delay period. The second delay period could be equal to, or different from, the first delay period, and could also be, for example, zero, 0.75 seconds, 1.0 seconds or 1.5 seconds. Alternatively, once a zone's sensor has detected an article, the state of that zone maybe "latched" to occupied until the sensor becomes unblocked and that zone is energized (the requirement that the zone is energized may be used to reflect that the article has been released from the zone). In embodiments where it is supported, such "latching" may be configurable by zone, and may be used to ensure that the occupied state of a zone does not change unless the article has been released from that zone.

If the local zone is considered occupied (i.e., determination block 22="Yes") in determination block 24 the zone immediately downstream of the local zone, LZ+1, may be examined by the controller for whether the zone immediately downstream of the local zone, LZ+1, is considered occupied. If the downstream zone is considered occupied (i.e., determination block 22="Yes"), in block 26 the controller may set the local zone speed equal to the effective speed (calculated as described below) of the zone immediately downstream of the local zone, LZ+1. In block 28 the controller may exit examining the current local zone, and control logic 18 may then be re-executed for the next upstream zone, continuing the execution until all zones of the plurality of zones have been examined.

Of course, if the local zone being examined is the discharge zone, there may be no physical downstream zone on the accumulation conveyor to consider at blocks 24 or 26. To account for this, a system implementing control logic 18 may be configured with conditions for consideration at block 24 and 26, which conditions may be selectively predetermined (e.g., default values) or which may vary based on conditions of other components of the material handling system. For example, a system could be configured to treat the speed of the downstream zone for the discharge zone of the accumulation conveyor as being equal to the speed of the conveyor immediately downstream of the discharge zone (For example conveyor 14 in FIG. 1A), or as being equal to the speed of the conveyor downstream of the discharge end once certain conditions for operation of that conveyor (e.g., a required gap between articles) has been accounted for (e.g., if the required gap between articles on the conveyor immediately downstream of the discharge end is 10% of the average article length, and the gap between articles in the discharge zone is 5% of the average article length, then the speed of the zone downstream of the discharge zone can be treated as equal to about 95% of the actual speed of the conveyor immediately downstream of the discharge end).

If the local zone is not occupied (i.e., determination block 22="No"), at block 30a the controller may calculate an effective speed for the local zone. The effective speed may be based, at least in part, on the effective speed calculated for one or more downstream zones, which may or may not begin immediately downstream of the local zone. It may be based on other attributes of one or more downstream zones. By way of non-limiting example, a formula which may be used to calculate effective speed is given by:

$$V_{LZ} = \sqrt{(2|D_{LZ}|*L_{LZ} + (V_{LZ+1})^2)}$$

Where $V_{LZ}$ is the velocity (speed) of the local zone, $D_{LZ}$ is the deceleration rate of the local zone, $L_{LZ}$ is the length of the local zone, and $V_{LZ+1}$ is the velocity (effective speed) of the downstream zone, LZ+1. Preferably, in an embodiment using a calculation such as shown above, LZ+1 will be immediately downstream (adjacent) the local zone, although LZ+1 does not have to be adjacent the local zone and may be spaced further downstream of the local zone.

In some embodiments, there may be a configurable minimum speed which represents the lowest speed at which a zone may be practically operated. In such a case, if a zone's calculated speed is below the minimum speed for that zone, then the effective speed for that zone may be set to zero. Similarly, there may also be a configurable maximum speed. A way of expressing the above formula subject to a maximum speed is:

$$V_{LZ} = \min(\sqrt{(2|D_{LZ}|*L_{LZ} + (V_{LZ+1})^2)}, V_{LZ\_max})$$

Where $V_{LZ\_max}$ is the configurable maximum speed for the local zone.

In an embodiment, the deceleration rate ($D_{LZ}$) may be stored in a database table, and may initially be based on predetermined default values which may be adjusted based on actual performance. Alternatively, deceleration rate may be set uniquely based on article characteristics, such as calculated by type of article or uniquely calculated for each individual article, based on known or detected characteristics of such individual article, such as physical properties, such as weight, or through observed performance such as by dynamically tracking the actual motion of articles, which, for example, may be compared to expected motion for the article, whether as expected default motion for the type of article or for the individual article.

At determination block 32 the controller may examine whether the local zone is the infeed zone. If it is the infeed zone (i.e., determination block 32="Yes"), there are no upstream zones to be considered by the logic. For the infeed zone, the accumulation system may be configurable, such as based on information stored in a database, to set the infeed zone to operate at either full speed or at the calculated effective speed. At determination block 34 the controller may determine whether the infeed zone is configured to permit setting the speed to the calculated effective speed. If the accumulation system is configured to permit setting the infeed zone speed to the calculated effective speed (i.e., determination block 34="Yes"), then at block 36 the controller may execute the control logic 18 to set the infeed zone (which is, in this case, the local zone being considered) speed to the calculated effective speed and proceed to exit at block 28. If the accumulation system is not so configured (i.e., determination block 34="No"), at block 38 the controller may execute control logic 18 to set the infeed zone speed to full speed and proceeds to exit at block 28. From block 28, since in this instance, the uppermost upstream zone has been considered, the controller may begin to execute control logic 18 again starting with the discharge zone, for example as may be initiated by the main instruction logic loop controlling accumulation conveyor 2.

The speed of the local zone may also be selected or set based on conditions of the upstream zone. Progressing in the upstream direction starting with the zone immediately upstream of the local zone, the controller may execute control logic 18 may to examine the upstream zones to assess conditions of the upstream zones, determining whether there is an upstream zone operating at full speed or an upstream zone which has detected an article (e.g., the sensor detects an article). If the controller identifies an upstream zone running at or above a first speed, which may be a full speed, or has examined all of the upstream zones (i.e., reached the end of the neighborhood), the local zone may be set to run at a second speed, which may be full speed. If prior to identifying an upstream zone running at full speed or reaching the end of the neighborhood, the controller detects an upstream zone whose occupied status is occupied, the speed of the local zone may be set to the calculated effective speed to prepare for the incoming article.

For the preferred embodiment, which utilizes pneumatic pulse width modulation, by considering upstream zone conditions, a zone which is not occupied may not be operated at an effective speed (which may be less than full speed) until necessary to avoid unnecessary cycling of a control valve and wasting air.

Blocks 40, 42, 44 and 46 illustrate an implementation of considering upstream zone conditions. Initially the value of n may be set to 1 and at determination block 40 starting with the zone immediately upstream of the local zone being examined, the controller may execute control logic 18 to examine whether an article is detected at the upstream zone, LZ-n. For example, an article may be detected by determining whether the upstream zone, LZ-n's sensor is blocked. If an article is detected (i.e., determination block 40="Yes"), in block 36 the controller may set the local zone speed to the calculated effective speed. If an article is not detected for the upstream zone, LZ-n, under consideration (i.e., determination block 40="No"), at determination block 42 the controller may execute control logic 18 to determine whether the speed of that upstream zone is set to full speed. If it is (i.e., determination block 42="Yes"), the local zone speed may be set to full speed by the controller at block 38. If the speed of the upstream zone is not full speed (i.e., determination block 42="No"), at determination block 44 the controller may execute control logic 18 to determine whether all upstream zones in the neighborhood have been considered for the local zone being examined ("end of neighborhood"). In an embodiment, the quantity of zones in the neighborhood may be a fixed number, and zones may be examined one by one. If all upstream zones have been not been considered (i.e., determination block 44="Yes"), in block 46 the value of n is increased by 1 and in determination block 40 the controller may look at the next upstream zone. If the end of the neighborhood is reached, for example all upstream zones have been considered (i.e., determination block 44="Yes") in block 38 the controller may execute control logic 18 to set the local zone speed to full speed at block 38.

Figure 3:
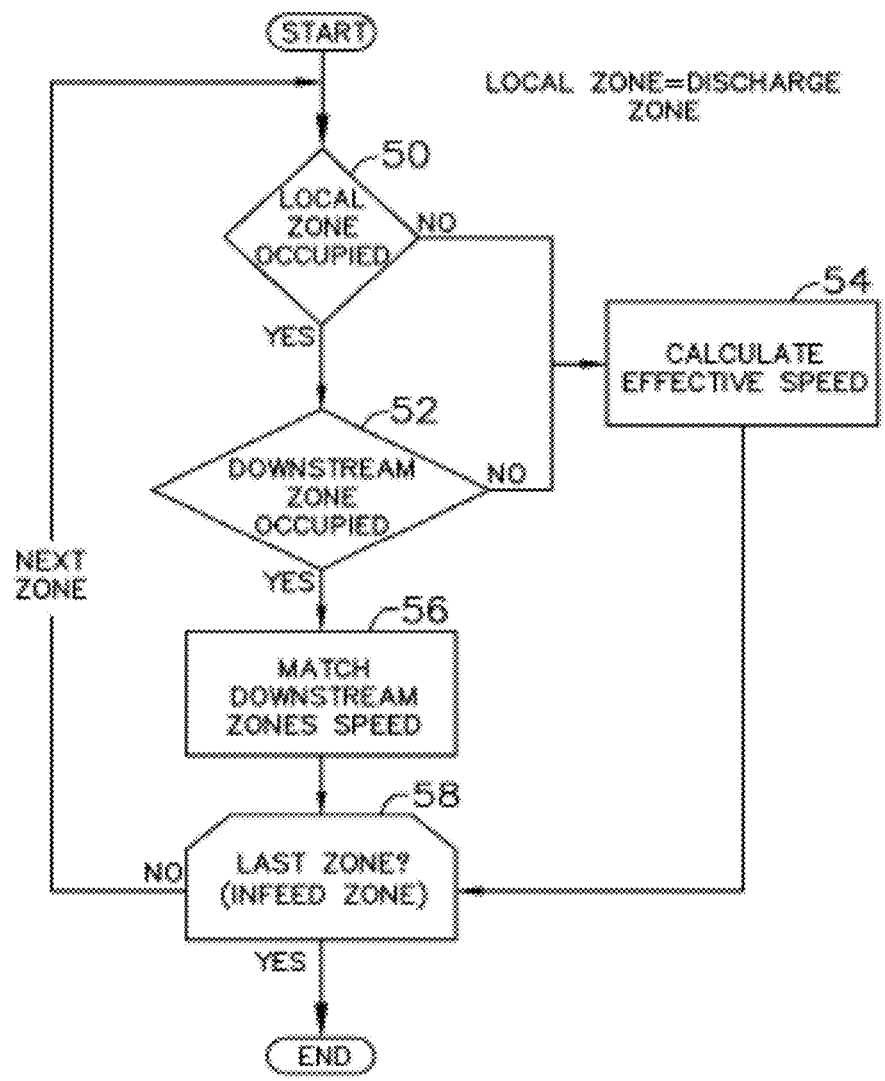
FIGS. 3, 4 and 5 are process flow diagrams illustrating operations for embodiment neighborhood zone control methods.
Figure 4:
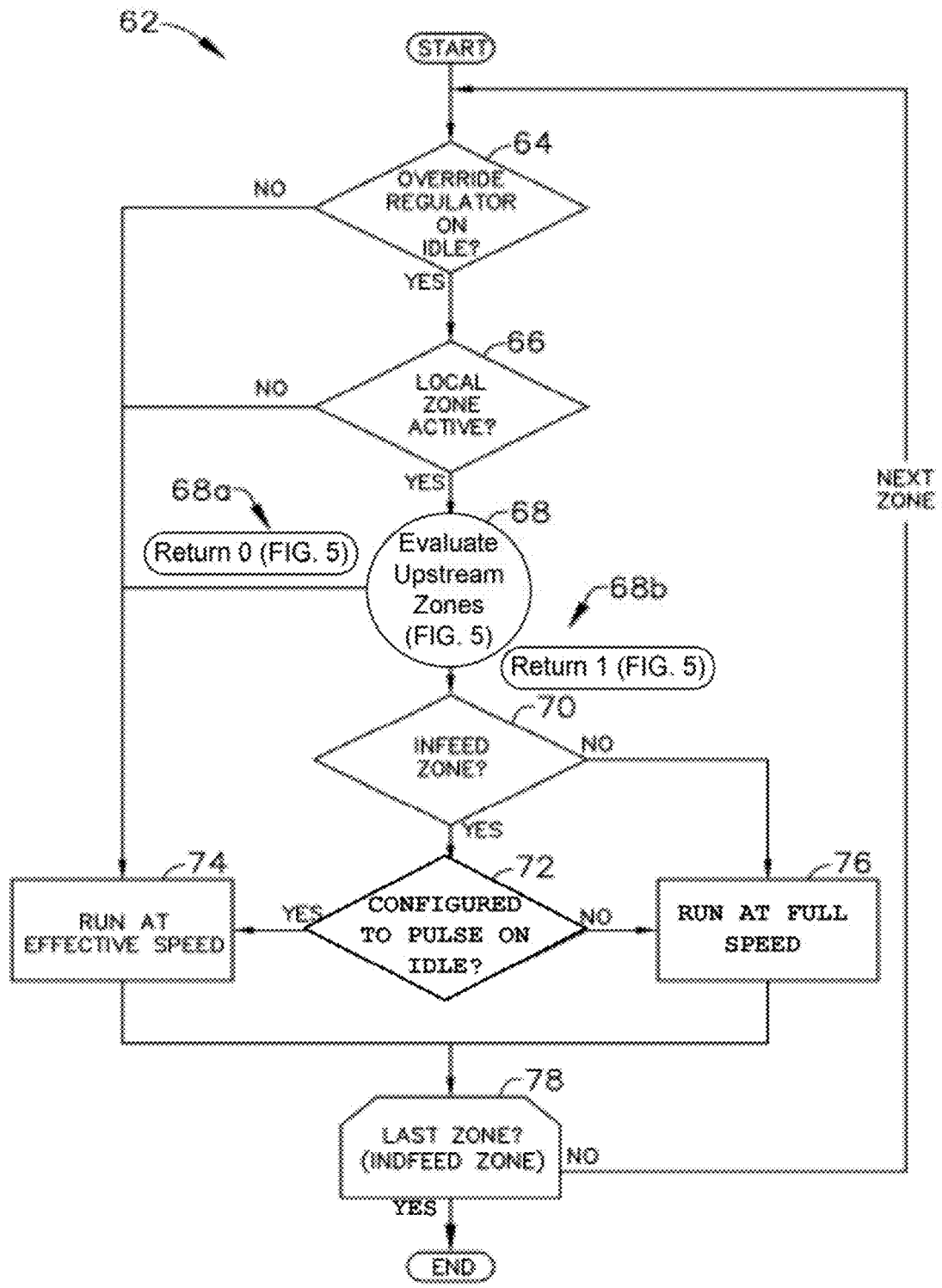
Figure 5:
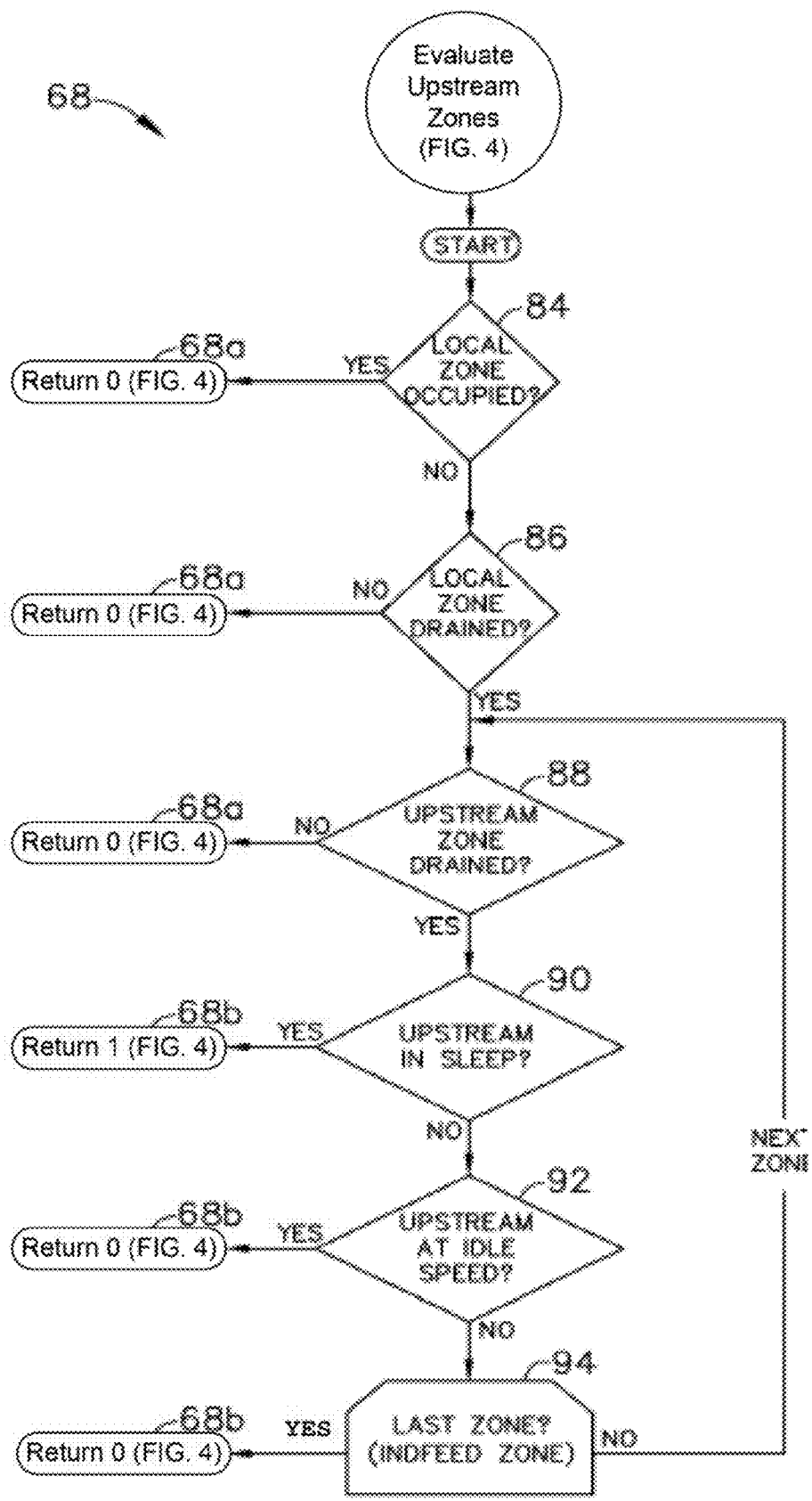

FIGS. 3, 4, and 5 illustrate methods that may be implemented in conjunction with the method illustrated in FIG. 2 in an embodiment. FIG. 3 illustrates a method for determining the respective effective speed for each zone of the plurality of zones according to operations of logic 48. Logic 48 may be part of a main instruction loop (e.g., the main instruction loop described below with reference to FIG. 6) controlling accumulation conveyor 2 and logic 48 may be executed for each active zone each time the main instruction loop executes. A controller may execute logic 48 to examine each of the plurality of zones, beginning with the discharge zone first and progressing upstream therefrom. In an embodiment, the operations of the method illustrated in FIG. 3, may be performed by a processor of a controller.

At determination block 50 the controller may determine whether the local zone is considered occupied. If the local zone is considered occupied (i.e., determination block 50="Yes"), at determination block 52 the controller may examine the downstream zone to determine whether it is considered occupied. When the local zone is the discharge zone, the system may be configured with a virtual zone "located" downstream of the discharge zone with predetermined characteristics or characteristics based on attributes of one or more actual systems of the material handling system. The use a virtual zone downstream of the discharge zone may make control logic 48 simpler to implement and more consistent in application because decisions based on the downstream zone of the discharge zone may be based on preselected characteristics.

If the local zone is not considered occupied (i.e., determination block 50="No") or the downstream zone is not considered occupied (i.e., determination block 52="No"), an effective speed may calculated for the local zone by the controller at block 54. The effective speed may be, as discussed above, based at least in part on the effective speed for one or more downstream zones, and may be calculated using the formula described above with reference to FIG. 2.

If the local zone and the downstream zones are considered occupied (i.e., both determination blocks 50 and 52="Yes"), then at block 56 the controller may set the effective speed of the local zone to match the effective speed of the immediately downstream zone. After calculating the effective speed or matching the downstream zone's speed in determination block 58 the controller may determine whether the local zone is the last zone (e.g., the infeed zone). If the local zone is not the last zone (i.e., determination block 58="No"), the next zone upstream may be examined as the local zone. In an embodiment, once all zones have been examined (i.e., determination block 58="Yes"), logic 48 may end until the next execution of the main instruction loop. As described below, selection of a speed at which a zone is to be driven may be part of a larger loop executed for each zone. Executing logic 48 the controller may only calculate the speed at which the zones are to be driven (subject to whether that speed is actually implemented by the control logic), which is referred to as the effective speed—and the controller may not implement the calculated effective speeds.

FIGS. 4 and 5 illustrate methods for setting the actual respective speeds of the zones according to operations of logic 62 and 68, respectively. Logic 62 illustrated in FIG. 4 may be part of the main instruction loop controlling the accumulation conveyor and may execute fully each time the main instruction loop executes. Logic 62 may be executed by the controller to examine each of the plurality of zones, progressing upstream beginning with the discharge zone first. In an embodiment, the operations of the method illustrated in FIG. 4, may be performed by a processor of a controller.

At determination block 64 the controller may determine whether the accumulation system control is configured to override the speed regulator for the local zone being examined when the local zone is idle, i.e., is not occupied and is considered drained. The drained state indicates there is a complete lack of product flow. A local zone is considered drained if its sensor (e.g., photo eye) is clear for a period of time, referred to herein as the drained delay. The drained delay time is reset when the sensor becomes blocked. The drained delay may be set at any suitable length, such as ten seconds. The drained delay may be configurable within a range, such as between zero to thirty seconds. Each zone may have its own unique drain delay. Such override might be set to "no" for certain specific circumstances, for example, in order to adjust the system during set up or for tuning the line. It is anticipated that during normal operation, the override would be set to "yes".

The speed regulator may function to effect the effective speed through pulse width modulation. When a zone is idle, there are conditions, such as no upstream articles, when it may be inefficient to regulate the zone's speed through pulse width modulation. If the system is configured to override the speed regulator when the zone is idle, then, when the zone is idle, the system may, in certain conditions, not implement an effective speed through pulse width modulation, instead operating the zone at full speed. If the system in not configured to permit overriding the speed determined by the speed regulator (i.e., determination block 64="No"), then the controller may execute logic 62 to set the speed of the local zone to the effective speed at block 74.

If the system is configured to override the speed regulator when the local zone is not occupied and is considered drained (i.e., determination block 64="Yes"), the controller may execute logic 62 to consider whether the local zone is active at determination block 66. Whether a zone is active may not be based on whether the zone is on or off, but based on whether it is enabled for operation. If the local zone is not active (i.e., determination block 66="Yes"), the neighborhood mode may not applied and the controller may set the speed of the local zone to the effective speed at block 74.

If the local zone is determined to be active (i.e., determination block 66="Yes"), the controller may execute control logic 62 to examine the upstream zones of the local zone's neighborhood according to the method illustrated in FIG. 5 which illustrates logic of evaluating upstream zones 68. Referring to FIG. 5, the controller may execute logic 68 to evaluate upstream zones and return 0 or return 1 based on the evaluation. In an embodiment, the operations of the method illustrated in FIG. 5, may be performed by the processor of the controller. Proceeding from determination block 66 (FIG. 4), the controller may execute logic 68 and start with the local zone being examined and progresses upstream therefrom until a condition results in a return "0" 68a or return "1" 68b. At determination block 84 the controller may determine whether the local zone is considered occupied. If it is occupied (i.e., determination block 84="Yes"), then controller may execute logic 68 to return "0" at return 68a and proceed to FIG. 4. If the local zone is not considered occupied (i.e., determination block 84="No"), the controller may execute logic 68 to determines at determination block 86 whether the local zone is considered drained. If the local zone being examined is determined not to be drained (i.e., determination block 86="No"), the controller may execute logic 68 to return "0" at return 68a and proceed to FIG. 4.

If the local zone is drained (i.e., determination block 86="Yes"), the controller may execute logic 68 to begin to examine the local zone's neighborhood, starting with the zone immediately upstream of the local zone and progressing upstream therefrom until a condition results in a return. At determination block 88 the controller may execute logic 68 to determine whether the upstream zone is drained. If it is not (i.e., determination block 88="No"), the controller may execute logic 68 to return "0" at return 68a and proceed to FIG. 4. If the upstream zone is drained (i.e., determination block 90="Yes"), the controller may execute logic 68 to determine whether the upstream zone is in sleep mode at determination block 90. Sleep mode may be a configurable mode that may be used to temporarily suspend operation of an active zone which is running at full speed and has not detected an article for a period of time, referred to as the sleep time delay. The sleep time delay may be the time delay that must expire for a zone before it will enter the sleep mode. Sleep mode may include a configurable optional conveyor running input. An active zone may use the status of its sensor and the sensors of the immediate upstream zone and the second upstream sensor to determine the sleep operating state. The zone may enter sleep if all three zone sensors have been clear for a set sleep time delay. The sleep time delay may reset if any of the three zone sensors become blocked. If the upstream zone is in sleep mode (i.e., determination block 90="Yes"), the controller may execute logic 68 to return "1" at return 68b and proceed to FIG. 4.

If it is determined that the upstream zone is not in sleep mode (i.e., determination block 90 "No"), at determination block 92 the controller may determine whether the upstream zone is set at idle speed. If it is (i.e., determination block 92="Yes"), the controller may execute logic 68 to return "0" at return 68b and proceed to FIG. 4. If the upstream zone is not set at idle speed (i.e., determination block 92="No"), the controller may execute logic 68 to determine whether there is another upstream zone to consider at determination block 94. For example, the controller may determine whether the current zone is the infeed zone. If there is another upstream zone (i.e., determination block 94="No") then the operations of blocks 88, 90, 92, 94 may be repeated for the next upstream zone. If all upstream zones have been considered (i.e., determination block 94="Yes"), the controller may execute logic 68 to return "0" at return 68b and proceed to FIG. 4.

In FIG. 4, if returning "0" at return 68a from FIG. 5, the controller may execute logic 62 to set the speed of the local zone to the effective speed at block 74. If returning "1" at return 68b from FIG. 5, at determination block 70 the controller may determine whether the local zone being examined is the infeed zone. If the local zone is the infeed zone (i.e., determination block 70="Yes"), in determination block 72 the controller may determine whether the system is configured to permit setting the infeed zone speed to the effective speed. If it is (i.e., determination block 72="Yes"), then at block 74 the controller may set the local zone, i.e., the infeed zone, to run at the effective speed. If the system is not configured to permit setting the infeed zone to run at the effective speed (i.e., determination block 72="No") or if the zone is not the infeed zone (i.e., determination block 70="No"), then the controller may set the zone at block 76 to run at full speed.

Once the local zone has been set to run at either the effective speed at block 74 or full speed at block 76, the control may execute logic 62 to determine at determination block 78 whether all zones have been examined. If there are more zones to examine (i.e., determination block 78="No"), the controller may return to block 64. If there are no more zones to examine (i.e., determination block 78="Yes"), the controller may to the main instruction loop.

Figure 6:
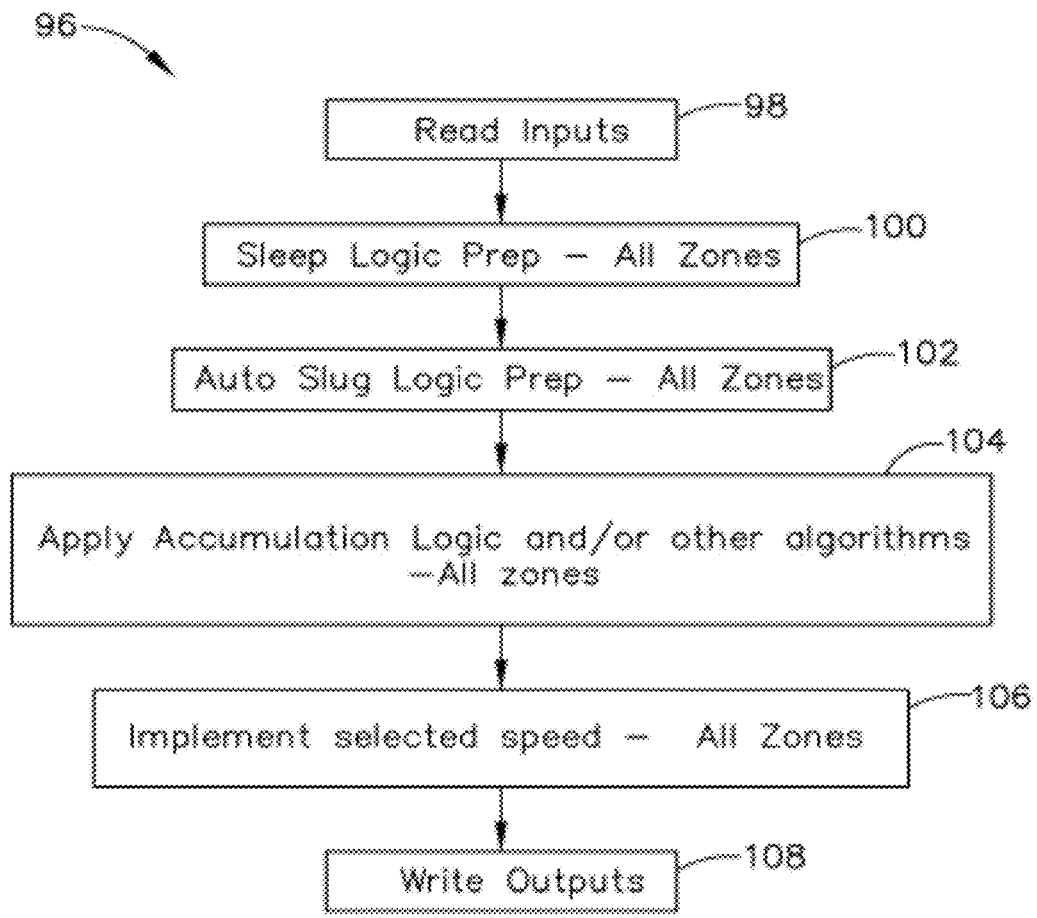
FIG. 6 is a process flow diagram illustrating an embodiment method for accumulation flow control.

FIG. 6 illustrates an embodiment method for accumulation flow control. Accumulation flow control logic 96 may be executed as instructions by a processor of controller 16 to cause accumulation conveyor to perform the operations described herein. The method illustrated in FIG. 6 may comprise three categories of operations including: read inputs (represented by block 98); solve logic (represented by blocks 100, 102, 104 and 106); and write outputs implementing control (represented by block 108).

In FIG. 6, after inputs are read at block 98, the controller may execute logic 96 to update values related to sleep mode at block 100 then update values related to auto slug mode at block 102, neither of which may be required for implementing neighborhood zone control. In an embodiment, auto slug may be configurable by zone and may allow the configured zones to participate in a slug release. If the front carton of the slug is commanded to run, and it is known that it will not be stopping in the next zone to accumulate, and the entire slug may remain intact (rather than singulating) if the zones that hold the slug all run at the same time together.

At block 104 the controller may execute logic 96 to apply the accumulation control logic and other algorithm logic to all zones. Thereafter, at block 106 the zone speeds selected by execution of block 104 may be implemented by the controller for all zones, and at block 108 the controller may write the outputs.

Figure 7:
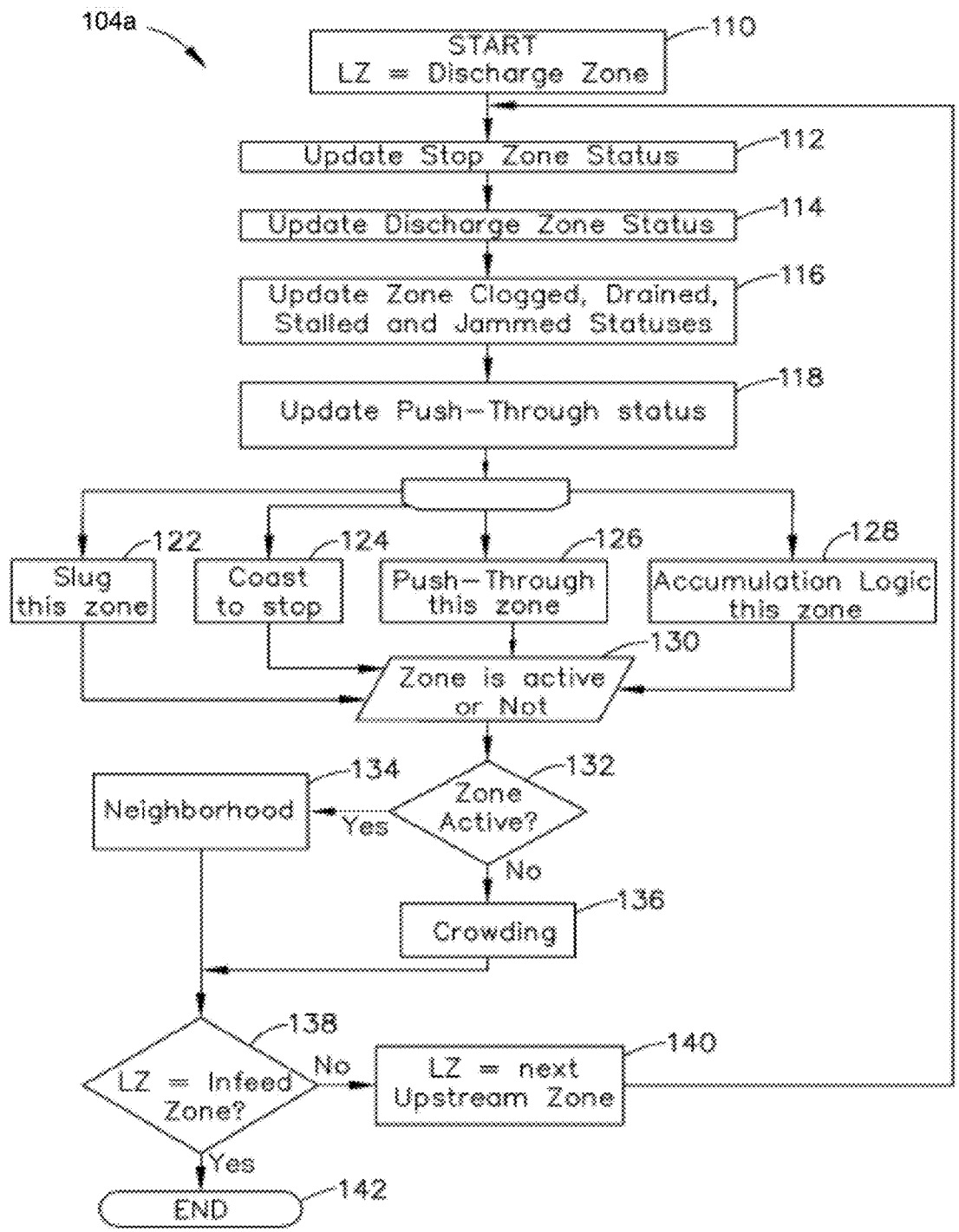
FIG. 7 is a process flow diagram illustrating an embodiment method for applying accumulation control logic and other algorithms.

FIG. 7 illustrates a method for implementing neighborhood zone. Control logic 104a may be executed by a processor of a controller to implement neighborhood zone control. Control logic 104a may be an example implementation of the operations that may be performed by a controller at block 104 of FIG. 6 to apply accumulation control logic. It is noted neighborhood zone control is not limited to combination with the specific steps illustrated in FIG. 7.

In the method illustrated in FIG. 7, the controller may execute logic 104a to start considering each local zone, one at a time, at block 110 by setting the local zone as the discharge zone then moving through the remainder of the zones sequentially in an upstream direction. At block 112 the controller may update the stop zone status of the local zone. Stop zone may be used to set a zone to inactive for the duration of an external command, regardless of the operating state of that zone. At block 114 the controller may update the discharge zone status, which may be applicable only when the local zone being considered is the discharge zone. The discharge zone status may be indicative of whether the discharge zone should be releasing.

At block 116 the controller may update the zone clogged, zone drained, zone stalled, and zone jammed statuses of the local zone. The zone clogged status may indicate an apparent, or potential, obstruction in a given zone. A local zone status may be set to clogged if the local zone sensor is blocked for a set time period, such as the clogged delay. The clogged delay may be reset when the local zone sensor becomes clear. "Jam" and "stall" are control strategies which may be implemented, independent of neighborhood zone control, for conditions when articles are not being transported in a zone as expected. They are local evaluations for each zone. Stall status may be the precursor to jam status. The zone stall status may indicate that article movement has been impaired or that a zone sensor is misaligned. A local zone status may be set to stalled when it is considered clogged and its immediate ($1^{st}$) downstream zone is considered drained. A stall may clear if the local zone sensor becomes clear. The zone jammed status may indicate that article transport has essentially stopped due to a stall condition. A local zone status may be set to jam when it is considered stalled and the immediate ($1^{st}$) upstream zone and the ($2^{nd}$) upstream zone statuses have been set to clogged.

At block 118 the controller updates the push-through status of the local zone being considered, e.g., whether the local zone needs to perform push-through. Push-through may occur when the local zone status is set to stall. Push-through logic may couple the local zone operating state (active/inactive) to the immediate upstream zone(s), in an attempt to push articles through the stall. Push-through may cease if the stall is cleared. Push-through may be disabled if a jam condition is determined to exist.

Based on the updated status of the local zone being considered by the controller executing logic 104a, the operational mode of the local zone may be set at one of block 122 to slug mode for the zone, block 124 to coast to stop or drop to gravity mode for the local zone, block 126 to push-through mode for the local zone, or block 128 to accumulation mode for the local zone. If the local zone is to perform in the slug mode, the local zone will be active. If the local zone is to perform in the drop to gravity mode, the local zone will be inactive. If the local zone is to perform in the push-through mode, the local zone will be active or inactive for a period of time. If the local zone is to perform in the accumulation mode, the local zone will be active or inactive.

With the setting of performance modes at blocks 122, 124, 126, or 128, the controller identified at block 130 whether the zone is active or inactive. At determination block 132 the controller determines whether the zone is active. If the local zone is active (i.e., determination block 132="Yes"), control may pass to the neighborhood zone control at block 134. At block 134 neighborhood zone control logic, such as logic 48 described above with reference to FIG. 3, may be implemented. Implementation of logic 48 at 134 may be done one zone for each loop of logic 104a, omitting execution of block 58 of logic 48.

If the local zone is not active (i.e., determination block 132="No"), control will pass to the crowding algorithm at block 136. Crowding may be a local control strategy that attempts to minimize article gap on an accumulated local zone by pulsing the local zone between active and inactive. It may begin when a local zone is considered accumulated for period of time and the immediate ($1^{st}$) downstream zone is either considered crowded or is not configured for crowding. A local zone may not configured for crowding may always report its status as crowded to the immediate ($1^{st}$) upstream zone. A discharge zone may not be configured for crowding but may always report its status as crowded.

Following blocks 134 or 136, in determination block 138 the controller may determine whether the local zone is the infeed zone. If not (i.e., determination block 138="No"), then in block 140 the local zone may be set to the next upstream zone, and logic 104a may loop back to block 112. If the controller has considered all of the zones the local zone being considered may be the infeed zone (i.e., determination block 138="Yes"), in block 142 the controller may proceed to block 106 of logic 96 illustrated in FIG. 6. As described above at block 106, the speeds selected in execution of the logic may be implemented, such as by executing logic 62 of FIG. 4.

Another example of one or more operational conditions on which determination of at what speed to set a local zone may be based is the state of the neighborhood zones, such as whether the neighborhood zones are energized. The controller may consider how many of a predetermined number of downstream zones ("zone base") are actively running, and set the local zone's speed based on that information. For example, the speed may be a percentage of full speed based on the number of downstream neighborhood zones that are energized. This may be the number of sequential downstream zones that are active. By way of non-limiting illustration, if the predetermined number of downstream zones is set to four, and three consecutive zones of these four zones are energized, the local zone could be set to ¾ of the full speed.

As will be apparent to one of ordinary skill in the art, the preceding control strategies may be implemented using a variety of computing environments, and the computing environments may differ from one another based on device layouts and/or other factors. For example, in an accumulation conveyor 2, such as shown in FIG. 1A, each individual module 4c, 6c, 8c, 10c, 12c could be implemented with elements (e.g., suitably programmed processor(s)) which would perform the speed determination and implementation logic described above (e.g., using information provided by other modules configured to control neighborhood zones). Alternatively, it is also possible that logic such as described previously would be performed on a controller 16, with the individual modules 4c, 6c, 8c, 10c, 12c implementing commands determined based on that logic after receiving them via direct connections (not shown in FIG. 1A) back to the controller 16. Still further variations, such as combinations of the above approaches are also possible. For example, the disclosed technology could be used to implement a system in which individual modules are daisy chained together via EtherCAT connections but, rather than executing logic such as shown in FIGS. 2-5 themselves, the modules may implement commands determined by a separate controller. Accordingly, the specific architectures described herein should not be treated as implying limitations on potential embodiments of the disclosed technology, or on the protection afforded by this (or any related) document.

In various embodiment, translation tables may be used to help address issues (e.g., ease of reusing software used to implement control logic) related to differences in computing environments which may exist in various implementations. In implementations where there is a controller (e.g., controller 16 from FIG. 1A) determining commands for multiple modules, such a controller may preferably be configured with one or more translation tables indicating what zones incoming information should be treated as coming from, and how outgoing commands for controlling specific zones should be routed. With such a translation table, addresses used for communication on the network could be automatically converted to the zone numbers used by the controller (and vice versa), allowing the actual logic used to determine the zones' desired operation to be completely independent of (and therefore operate without knowledge of) the topology of the relevant communication network, or the network addresses of the devices which would implement the controller's commands. An example of the type of information which could be included in such a translation table is provided in table 1 which correlates zones with their respective modules and sides for sending/receiving data.

TABLE 1

Illustrative translation table for use in identifying the individually addressable entities which send information regarding, and execute commands for, particular zones.

| Zone | Module and Side for Sending/Receiving Data |
| --- | --- |
| 4a | 4c-a |
| 4b | 4c-b |
| 6a | 6c-a |
| 6b | 6c-b |
| 8a | 8c-a |
| 8b | 8c-b |
| 10a | 10c-a |

TABLE 1-continued

Illustrative translation table for use in identifying the individually addressable entities which send information regarding, and execute commands for, particular zones.

| Zone | Module and Side for Sending/Receiving Data |
|---|---|
| 10b | 10c-b |
| 12a | 12c-a |

Of course, it should be understood that the translation table set forth above as table 1 is intended to be exemplary only, and that the translation tables used in actual implementations may include other types or amounts of information different from that provided in table 1. For example, zones may be mapped to other types of addresses, such as IP addresses, MAC addresses, physical or logical EtherCAT addresses, slot numbers, port numbers, and combinations of the same (e.g., an address made up of an IP address, a MAC address or an EtherCAT address for a module, combined with a slot or port number for a side or other individually addressable portion of the module). Similarly, it is possible that multiple translation tables may be used. For example, a first translation table may provide a mapping between zones and logical addresses of the modules (or portions of the same) corresponding to those zones, and a second translation table may provide mappings between the logical addresses and the corresponding physical addresses of the appropriate devices.

Translation tables such as discussed above may be created in a variety of manners. For example it is possible that a human may manually create such a translation table by studying the topology of the network used for communicating with the modules, identifying the module (or individually addressable portion of a module) corresponding to each zone, and using a text editor to create a table where each record/row in the table correlated a zone with the MAC address of the device which controlled the zone. However, such manual table creation approaches are difficult, time consuming, and error prone, and so it is preferred that translation table creation be performed automatically. For example, translation tables may be created using software which was programmed to receive information regarding the modules which control the individual zones in a material handling system, and use that information, to automatically derive the translation table or tables which may be used for communicating with those modules.

Figure 8:
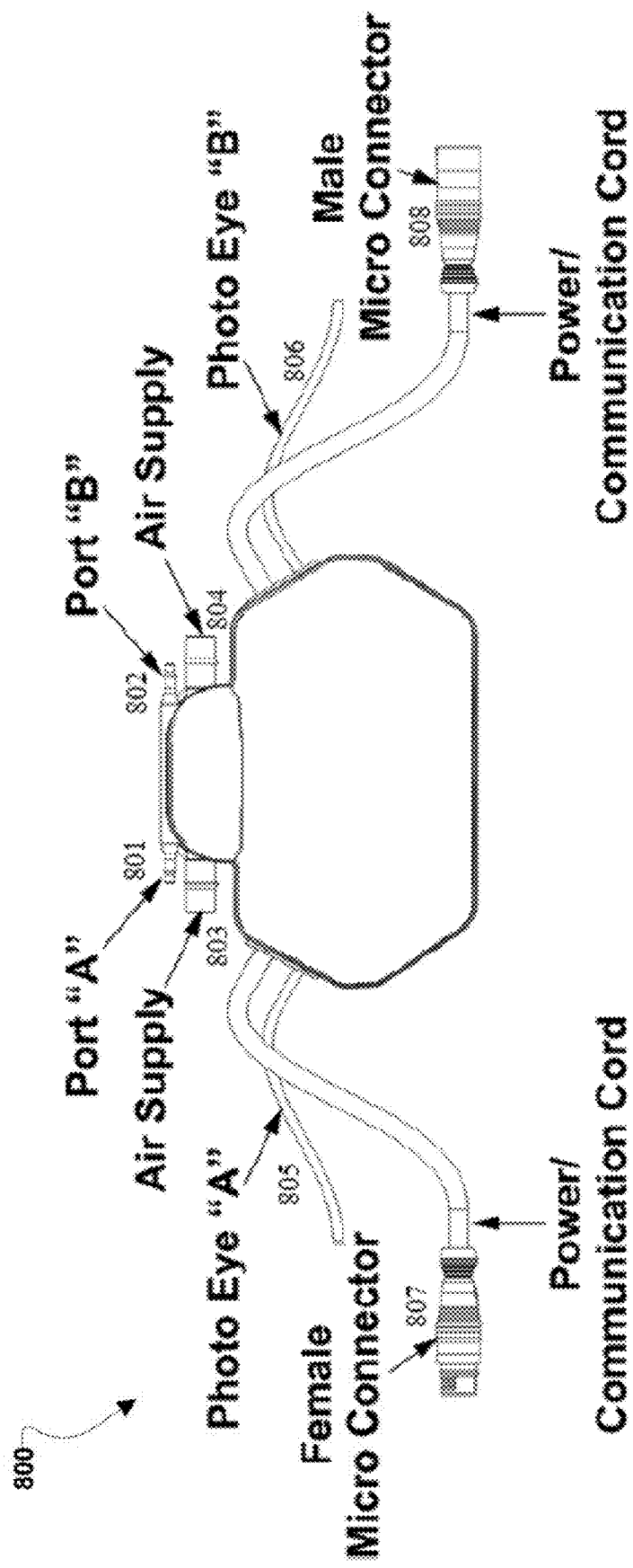
FIG. 8 illustrates an exemplary control module.

To illustrate how the automatic creation of translation tables may occur, consider a case in which the zones in a material handling system are controlled by one or more control modules 800 of the type shown in FIG. 8, and where the modules 800 are connected together via a daisy chain network (e.g., an EtherCAT network). As shown in FIG. 8, each of the modules 800 may comprise two independently addressable portions (referred to as the A side, located on the left of the module, and the B side, located on the right of the module), each of which comprises a port 801,802 (usable, for example, in connecting to a pneumatic actuator for a zone controlled by that side), an air supply connection 803, 804 (usable, for example, in connecting to a source of compressed air), a photo-eye connection 805, 806 (usable, for example, in reading data from a photo-eye configured to detect articles in the zone controlled by the side), and a network interface 807, 808 (usable, for example, in connecting the module to the next device in the daisy chain network). The control modules 800 may include components similar to those of control modules 4c, 6c, and 8c described above with reference to FIG. 1B.

For the purpose of this illustration, it should be assumed that the A side and B side of the control module 800 will always be located, respectively, on the left and right sides of the module 800 (i.e., that the modules 800 will not be turned upside down, or be mirror images of each other), and that the direction of processing on the daisy chain network is from the A side to the B side of sequential modules 800, and from the B side to the A side within modules 800 (i.e., for each module 800, the A side of the module 800 is the forwarding side of the module 800, and the B side of the module 800 is the processing side of the module 800). It should also be assumed that the A and B sides of the individual modules 800 are designed to connect to each other (e.g., by having a female connector on the A side with a complimentary male connector on the B side), such that, if a B side is to be connected to a B side, or an A side is to be connected with an A side, some kind of adapter (e.g., a male to female adapter) would need to be used.

When modules such as those illustrated in FIG. 8 are used to control zones, it is possible to automatically create the translation table(s) which would be used for communication between the controller and the different individually addressable sides of the modules (also referred to herein as the modules' "slots") which may control the zones in the material handling system based on a simple description of the daisy chain network comprising lists such as set forth in table 2.

TABLE 2

Illustrative lists which could be used to generate translation tables.

Figure 9:
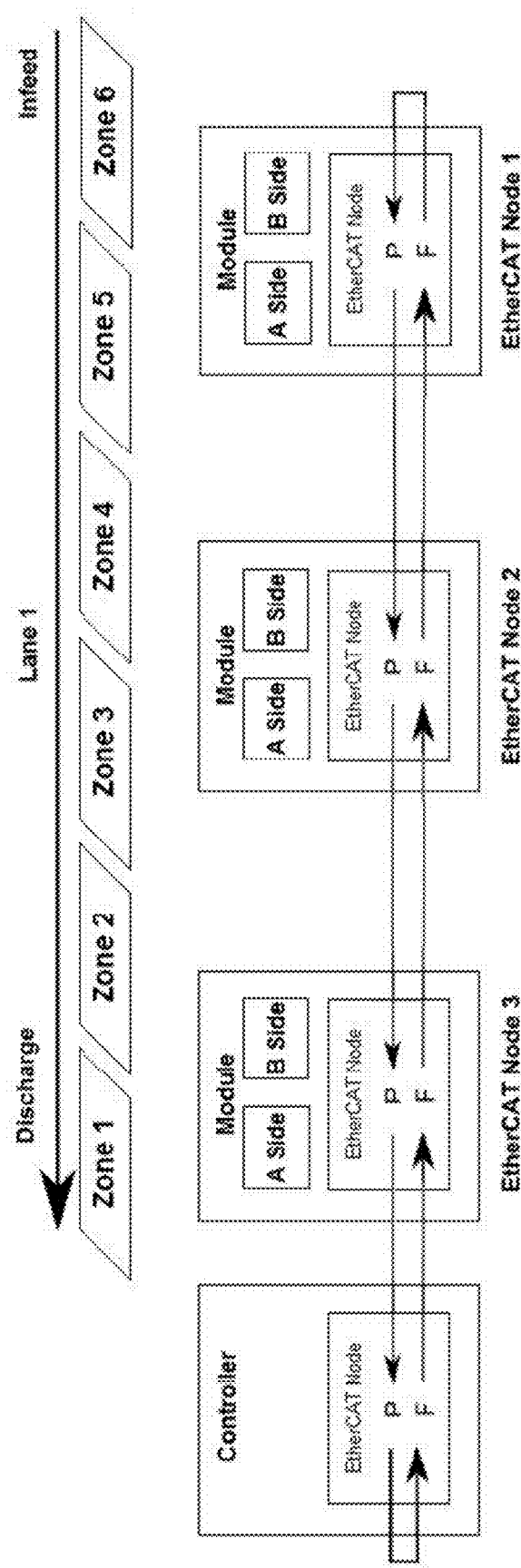
FIG. 9 illustrates an exemplary network and conveyor configuration.
Figure 10:
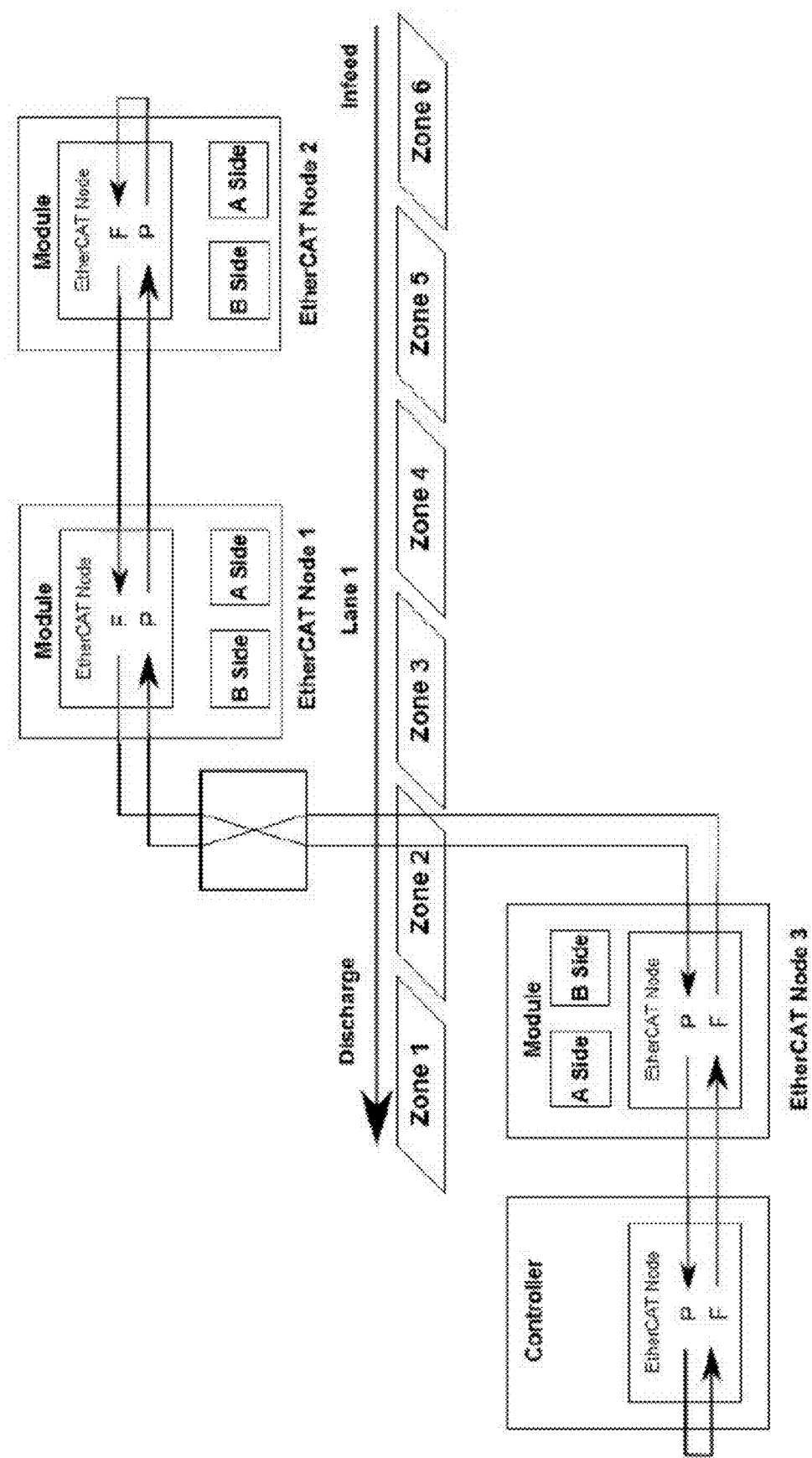
FIG. 10 illustrates an exemplary network and conveyor configuration.
Figure 11:
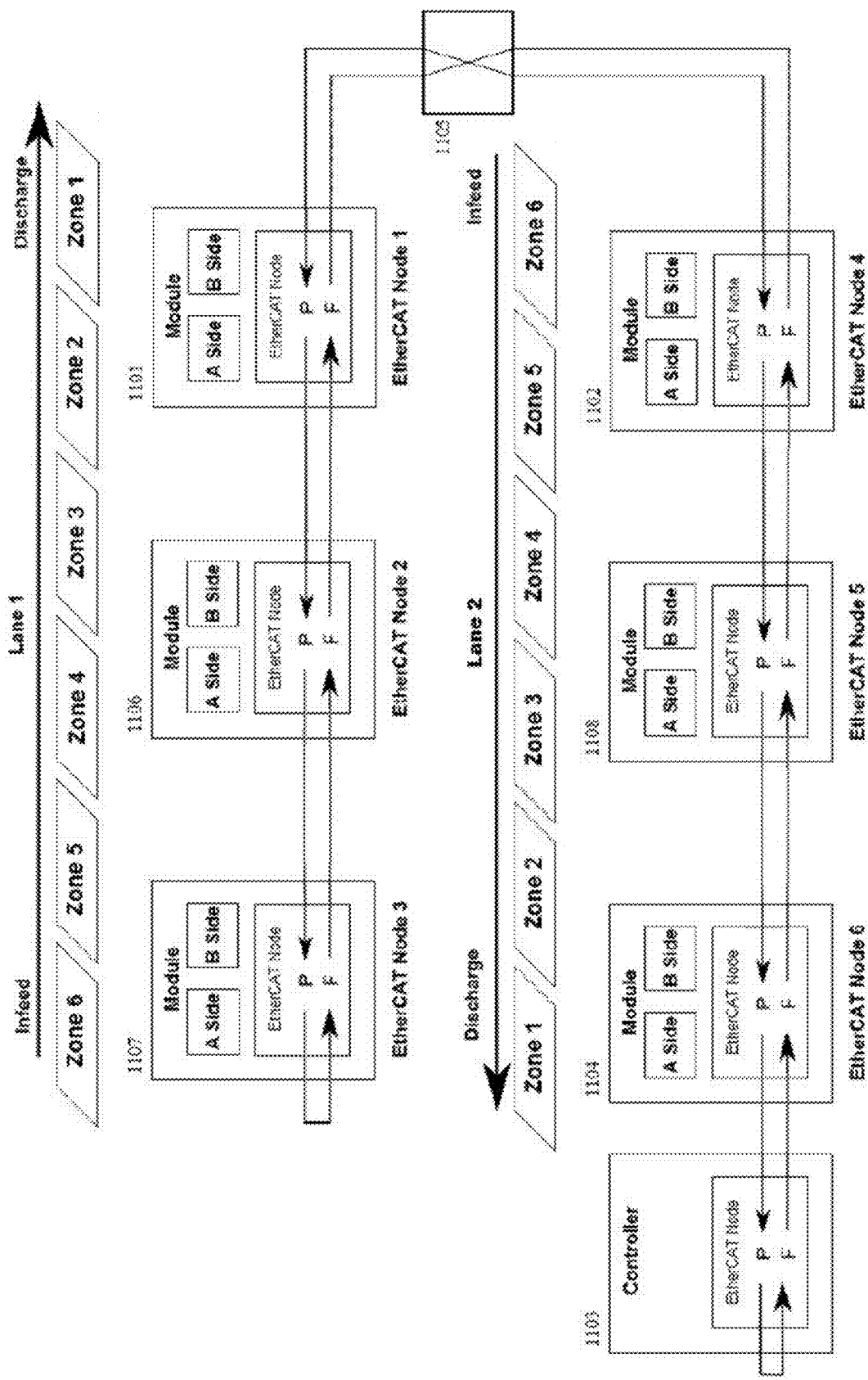
FIG. 11 illustrates an exemplary network and conveyor configuration.

List 1: Module, Module, Module
List 2: Module, Adapter, Module, Module
List 3: Module, Module, Module, Adapter, Lane, Module, Module, Module In table 2, the first illustrative list (List 1) corresponds to the configuration shown in FIG. 9, in which each of the modules controls two zones on a single conveyor, and all of the modules are located on the same side of the conveyor as the controller. The second illustrative list (List 2) in table 2 corresponds to the configuration shown in FIG. 10, in which each of the modules controls two zones on a single conveyor, but not all modules are placed on the same side of the conveyor as the controller (e.g., because part of the conveyor is obstructed, such as because it turns a corner). The third illustrative list (List 3) in table 2 corresponds to the configuration shown in FIG. 11, in which the modules control zones on two different conveyors. It should be understood that, while FIGS. 9-11 show different lines carrying communications in the processing and forwarding directions of the depicted EtherCAT network. This depiction of different lines is intended to reflect conceptual separation of processing and forwarding directions on the network, and should not be treated as requiring the existence of multiple lines connecting adjacent modules. Indeed, as reflected in FIG. 8, preferably a single line will be used to connect adjacent modules on the daisy chain network. Similarly, while table 2 illustrates configuration data regarding the relevant configuration which is set forth in the form of lists, in embodiments where it is present, configuration data used in the automatic creation of translation tables may be represented in a variety of manners, such as tables, arrays, vectors, configuration files stored in non-volatile memory, or a network configuration stored in random access or other volatile memory on a suitably configured computer. Accordingly, the lists of table 2 should be understood as being illustrative only, and should not be treated as limiting on what type of configuration information (if any) may be used in automatic translation table creation.

In an embodiment, using a description of the sequence of the control modules and other network equipment, for example the lists in table 2, the network addresses of the control modules and other network equipment, the identifiers of the zones, and rules, such as network rules governing how I/O modules communicate and are discovered and zone rules governing how zones are numbered, one or more translation table correlating the identifier of each zone with the network address of its respective control module may be generated. For example, a controller may receive a description of a sequence of the control modules and the network addresses of the control modules. The controller may also receive the identifier of each zone of the plurality of zones. Applying network rules and zone rules using the description of the sequence of the control modules, the network addresses of the control modules, and the identifiers of each zone of the plurality of zones, the controller may generate a translation table correlating the identifier of each zone with the network address of its respective control module.

Using information about the network information such as provided in the lists of table 2, it is possible to automatically create a translation table by, essentially, determining the path which a message would take traveling through and being processed by the modules on the daisy chain network. Such a determination may track information including whether a message is traveling through the network in a network downstream direction (i.e., being communicated from a first device to a second device, where the first device is separated from the controller by fewer devices capable of processing messages (e.g., by modifying the messages' data and/or implementing any of the message's commands) than the second device), whether it had passed through a connection between non-complimentary network interfaces (e.g., because it had passed through an adapter which allows direct communication between module sides which are designed to perform the same function (e.g., direct A side to A side or B side to B side communication)), and if the message had crossed a lane boundary (e.g., in FIG. 11, a lane boundary exists between modules 1101 and 1102). An exemplary algorithm which may be used to create a translation table using this type of approach is set forth below in table 3.

TABLE 3

PHP style pseudo-code representation of exemplary algorithm for automatic translation table creation.

Advance Action, advance one module,
If new lane
LO = 2*M
If leaving mode
L−
Else
L++
If Direct Mode
M++
If Returning Mode, and not Terminal Module
M−−
//switch leaving/returning if reached far end of loop
If M equals the total number of modules TM, switch from leaving to returning
//switch mode due to crossover cable
If cross advance, alternate to opposite mode (direct mode | cross mode)
If current mode is direct/leaving
Record module M, slot A as lane L, zone ((2*M)−1)−LO, slot B as lane L, zone (2*M)−LO
Else If current mode is direct/returning
Assign node N, N++
Else if current mode is cross/leaving
Assign node N, N++
Record module M, slot B as lane L, zone ((2*M)−1)−LO, slot A as lane L, TABLE 3-continued PHP style pseudo-code representation of exemplary algorithm for automatic translation table creation.

zone (2*M)−LO
Else if current mode is cross/returning
Do nothing
Repeat Advance Action until M equals 0

To illustrate how an algorithm such as shown in table 3 may operate, consider the following description of how a translation table for the exemplary conveyor and network configuration of FIG. 11 may be created by iterating through the algorithm of table 3. When creating a translation table for the configuration of FIG. 11, on its first iteration, the algorithm of table 3 may treat the message whose path is being determined as leaving the controller 1103 and entering the network upstream most module 1104 on its forwarding side/A side. Because the algorithm has not yet encountered an adapter (i.e., a component which allows direct connections between non-complimentary network interfaces), the last module or a new conveyor lane, the determination is treated as being on the initial lane in direct leaving mode. Accordingly, the current module variable (M) is incremented, the lane offset variable (LO) is left at zero, the zone number controlled by side A of the current module is set equal to ((2*M)−1)−LO and the zone number controlled by side B of the current module is set equal to (2*M)−LO, resulting in the intermediate table shown below as table 4.

TABLE 4

Exemplary intermediate table which may be generated in automatically creating a translation table for the configuration of FIG. 11.

| Lane No. | Zone No. | EtherCAT Node No. | Slot No. |
|---|---|---|---|
| 2 | 1 | | A |
| 2 | 2 | | B |

The second and third iterations may be similar to the first, with the current module variable being incremented, the zone number for the current module's A side being calculated as ((2*M)−1)−LO, the zone number for the current module's B side being calculated as (2*M)−LO, the lane offset variable being left unchanged, and the determination being treated as being on the initial lane in direct leaving mode. The fourth iteration, however, may proceed differently. On that iteration, the message whose path is being determined may pass through the adapter 1105 and be received on the first module 1101 of the next lane on that module's processing side. As a result, the determination may be treated as having moved off of the initial lane and having changed mode to cross leaving mode. Then, following recalculation of the lane offset variable, the current module variable may be incremented, the current lane variable (L) may be decremented, the zone number for the current module's A side may be calculated as ((2*M)−1)−LO, the zone number for the current module's B side may be calculated as (2*M)−LO, and the current module may be treated as being the first module on the daisy chain network which receives the message on its processing side (referred to in the pseudo-code of table 3 as the module's node number, and tracked with the variable N), resulting in the intermediate table shown below as table 5.

TABLE 5

Exemplary intermediate table which may be generated in automatically creating a translation table for the configuration of FIG. 11.

| Lane No. | Zone No. | EtherCAT Node No. | Slot No. |
|---|---|---|---|
| 2 | 1 |   | A |
| 2 | 2 |   | B |
| 2 | 3 |   | A |
| 2 | 4 |   | B |
| 2 | 5 |   | A |
| 2 | 6 |   | B |
| 1 | 1 | 1 | B |
| 1 | 2 | 1 | A |

The next two iterations may be similar, with the message being treated as being received on the processing sides of the following two modules on the daisy chain network (i.e., modules 1106 and 1107), the current module variable being incremented, the numbers for the zones controlled by the individual slots of the current module being calculated in the same manner described, and the current module being assigned a node number since the message was being treated as being received on its processing side. An exemplary intermediate table showing how the table of table 5 may be updated after these next two iterations is provided below in table 6.

TABLE 6

Exemplary intermediate table which may be generated in automatically creating a translation table for the configuration of FIG. 11.

| Lane No. | Zone No. | EtherCAT NodeNo. | Slot No. |
|---|---|---|---|
| 2 | 1 |   | A |
| 2 | 2 |   | B |
| 2 | 3 |   | A |
| 2 | 4 |   | B |
| 2 | 5 |   | A |
| 2 | 6 |   | B |
| 1 | 1 | 1 | B |
| 1 | 2 | 1 | A |
| 1 | 3 | 2 | B |
| 1 | 4 | 2 | A |
| 1 | 5 | 3 | B |
| 1 | 6 | 3 | A |

However, while the calculations underlying the changes to the intermediate table which take place while iterating through modules 1106 and 1107 are essentially the same as those which would take place while iterating through module 1101, the internal state of the determination may not remain static while iterating through each of modules 1106 and 1107. In particular, because module 1107 is the last module on the daisy chain network, after iterating through that module, the simulation may switch to cross returning mode, meaning that it may iterate back through the modules on the daisy chain network, treating the message as being received on the modules' forwarding side and not making any changes to the intermediate table until after passing through the adapter 1105 and reaching the final module on the initial conveyor line (i.e., module 1102).

On the iteration where it returns to module 1102 (i.e., the tenth iteration), the algorithm of table 3 may switch from cross returning mode to direct returning to reflect the placement of adapter 1105 between modules 1101 and 1102. Thereafter, it will remain in direct returning mode, iterating through, and adding node number for, the modules on the initial conveyor (i.e., modules 1102, 1108 and 1104), until the decrementing of the current module variable on each iteration in returning mode results in the current module variable reaching zero, at which time the algorithm will terminate, having created a table such as shown in table 7.

TABLE 7

Exemplary table which may be created using the algorithm of table 3.

| Lane No. | Zone No. | EtherCAT NodeNo. | Slot No. |
|---|---|---|---|
| 2 | 1 | 6 | A |
| 2 | 2 | 6 | B |
| 2 | 3 | 5 | A |
| 2 | 4 | 5 | B |
| 2 | 5 | 4 | A |
| 2 | 6 | 4 | B |
| 1 | 1 | 1 | B |
| 1 | 2 | 1 | A |
| 1 | 3 | 2 | B |
| 1 | 4 | 2 | A |
| 1 | 5 | 3 | B |
| 1 | 6 | 3 | A |

It should be understood that the approach described above is intended to be illustrative only, and that other approaches may be implemented without undue experimentation by, and will be immediately apparent to, those of ordinary skill in the art in light of this disclosure. For example, rather than walking through modules on a daisy chain network and numbering each module based on the number of the preceding module which received the message on its processing side, modules may be numbered directly based on the layout of the network. An illustrative equation which could be used for this purpose is:

$$P_n = 1 + \text{OddUpstream}_n + ((\text{UpstreamAdapter}_n + 1)/2) * \text{ModulesDownstream}_n$$

Where $P_n$ is the processing sequence number for module n (i.e., one plus the number of modules on the daisy chain network which will have received a message through their processing side network interfaces before the message is received by module n on its processing side network interface), $\text{OddUpstream}_n$ is the number of modules which are disposed in a network upstream direction of module n and which are separated from the controller by an odd number of adapters/direct connections between non-complimentary network interfaces, $\text{UpstreamAdapter}_n$ is the number of adapters/direct connections between non-complimentary network interfaces which are disposed in a network upstream direction of module n, and $\text{ModulesDownstream}_n$ is the number of modules disposed in a network downstream direction of module n.

Similar direct calculation may also be used to associate a module numbered with the zones it controls using the equation:

$$Z_n = 1 + \text{DischargeNumber}_n + \text{ZonesDischargeModule}_n + \text{ZonesSeparatingDischarge}_n$$

Where $Z_n$ is the first zone controlled by module n, $\text{DischargeNumber}_n$ is a zone number for a zone disposed at the discharge terminal end of the conveyor comprising the zone controlled by module n, $\text{ZonesDischargeModule}_n$ is the number of zones controlled by the module which controls the zone disposed at the discharge end of the conveyor comprising the zone controlled by module n, and $\text{ZonesSeparatingDischarge}_n$ is the number of zones controlled by modules disposed between module n and the module controlling the zone disposed at the discharge end of the conveyor (e.g., if each module consists of two individually addressable portions, each of which controls a single zone, then ZonesSeparatingDischarge$_n$ would simply be twice the number of zones between module n and the module controlling the zone disposed at the discharge end of the conveyor).

It should be understood that direct calculations such as described above in the context of equations described above, like the exemplary message path determination based approach to automatic translation table creation described in the context of table 3, are intended to be illustrative only, and should be not treated as implying limits on the approaches which could be used to implement the inventors' automatic translation table creation. For example, as an alternative to the approaches described above, it is possible that automatic translation table creation may be performed by placing an object at the upstream most portion of a conveyor (i.e., the infeed of the conveyor), transporting the object from the upstream most to the downstream most portion of the conveyor, and monitoring the sequence in which the object is detected by the various modules or individually addressable portions of the same (e.g., based on the signals received from photo-eyes of modules such as shown in FIG. 8). The controller (or other device which has been provided with the object detection information) may then be used to build the translation table based on the sequence in which the object detection signals were received. An exemplary algorithm which may be used in this type of approach is set forth in pseudo-code form in table 8.

TABLE 8

C++ style pseudo-code representation of exemplary algorithm for automatic translation table creation.

```
Table learnTranslationTable( )
{
int current_zone_number = getInfeedZoneNumber( );
Table retval;
ObjectDetectionSignal signal;
while(current_zone_number > 0)
{
signal = getNextObjectDetectionSignal( );
retval.addRow(current_zone_number--, signal.getSenderAddress( ));
}
return retval;
}
```

Other types of variations are also possible, and even embodiments which use the same general approach to automatically creating translation tables might differ in the details of how their automatic translation table creation is implemented. For example, while embodiments of the disclosed technology may use translation table creation algorithms which add different types of information to a translation table based on different triggers (e.g., the algorithm of table 3, which adds zone numbers as long as it is operating in leaving mode, but only adds node numbers when its simulated message is received on a module's processing side), it is also possible that the material disclosed herein could be used to implement embodiments where all numbers for a particular module are added in response to a single trigger (e.g., where a node number is added in the manner shown in table 3, and zone numbers are added simultaneously (e.g., using the direct zone number calculation equation described above)).

Similarly, approaches described previously could be modified to allow them to account for information other than that which was explicitly discussed above. For example, to account for the possibility that different modules may control different numbers of zones, approaches such as those discussed previously in the context of table 3 and the various equations may be modified to receive information regarding how many zones are controlled by individual modules (e.g., information indicating which, if any, of the individually addressable portions of a module are not used to control a zone on a conveyor), and to use that information in their zone number determinations (e.g., by adding a separate term representing individually addressable portions of modules which are not used to control a zone to the equation used to associate a module numbered with the zones it controls described above, or by using a tracking variable reflecting the number of controlled zones to the algorithm of table 3). As another example, while the approaches described above effectively treated the numbering of zones as a given, the disclosed technology may also be implemented to receive information regarding the numbering of the zones to be controlled relative to the layout of the daisy chain network used to communicate with the modules (e.g., information indicating the total number of zones on a conveyor, whether the highest zone number should be allocated to an infeed or discharge zone, and whether the network upstream most module which controls any zones on a conveyor controls the zone at the conveyor's infeed or discharge end), and to use such information in determining the numbers for the zones which are controlled by the individually addressable portions of the modules on the daisy chain network (e.g., by using a version of the equations described above which determines zones based on whichever terminal end of the conveyor is the network upstream most terminal end, and which adds to or subtracts from that zone number based on the direction of numbering used in the particular system under consideration). Additional variations, such as using the approaches described herein to create separate translation tables for each lane controlled by modules on a daisy chain network are also possible, and may be implemented by those of ordinary skill in the art without undue experimentation in light of this disclosure. Accordingly, the approaches and exemplary variations described above should be understood as being illustrative only, and should not be treated as limiting.

It should be understood that variations between embodiments of the inventors' automatic translation table creation technology are not limited to variations between approaches for determining the information (e.g., zone numbers, addresses for modules and/or individually addressable portions of the same) which would be included in a translation table. For example, it is also possible that different embodiments of the inventors' translation table creation technology may differ in the architectures of the systems which would use a translation table after it had been created. For instance, in some cases, a single device (e.g., the controller 1103 of FIG. 11) may be used to determine how the zones on a conveyor should be operated, as well as to use a translation table to convert between the zone numbers used in determining the zones' desired operation and the network addresses used to identify the senders and recipients of messages on the daisy chain network. However, in other instances, entirely separate devices might be used to determine how the zones on a conveyor should be operated and to translate between zone numbers and network addresses (e.g., a separate network interface computer, not shown in FIG. 11, may be placed between the controller 1103 and the network upstream most module 1104). Similarly, while it is possible that a single device may both create a translation table and use that table to convert between zone numbers and network addresses during conveyor operation, it is also possible that these tasks may be performed by entirely separate devices which may not even have a network connection in common (e.g., a translation table could be created on a laptop computer running an algorithm such as shown in table 3, with the translation table being transferred to the device which would ultimately use it during conveyor operation via a removable memory device like a thumb drive).

Figure 12:
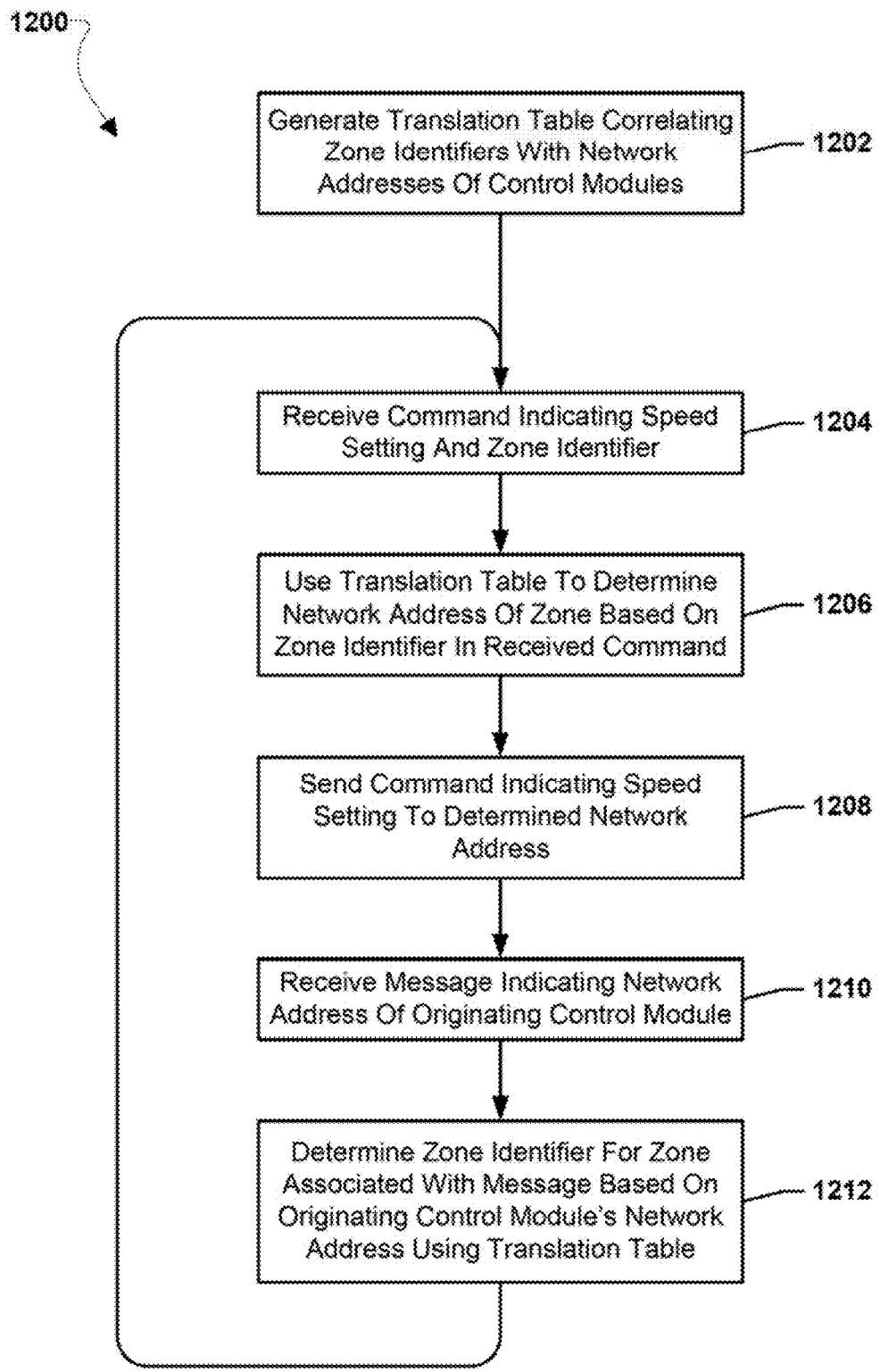
FIG. 12 is a process flow diagram illustrating an embodiment method for using a translation table correlating zone identifiers with network addresses.

FIG. 12 illustrates an embodiment method 1200 for using a translation table correlating zone identifiers with network addresses. In an embodiment, the operations of method 1200 may be performed by a processor of a controller, such as controller 16 described above with reference to FIGS. 1A and 1B. In block 1202 the controller may generate a translation table correlating zone identifiers with network addresses of control modules. The translation table may be generated automatically using any of the example methods described above, including network simulation based approaches, equation based approaches, object monitoring based approaches, etc. The translation table may correlate a zone identifier, such as a cardinal number indicating the zone (e.g., "1", "2", etc.) with one or more network address of the control module responsible for controlling and monitoring that zone. In this manner, the translation table may map each network address to a zone.

In block 1204 the controller may receive a command indicating a speed setting and zone identifier. As an example, the controller may receive a command indicating a selectable speed setting for a zone, such as a minimum, maximum, some intermediate speed value, or a state setting for an output switch controlling the zone, and the cardinal number identifying the zone to which the speed command is to be sent. The command may be generated by a conveyor control module or application and may be passed to a communication module or application which may interface between the conveyor control module or application and the network of daisy chained control modules controlling the various zones. In block 1206 the controller may use the translation table to determine a network address of the zone based on the zone identifier in the received command. For example, the controller may find the zone identifier in the translation table that matches the zone identifier in the received command and determine the network address of the zone as the network address correlated with the matching zone identifier. In block 1208 the controller may send the command indicating the speed setting to the determined network address. For example, the controller may send the command as part of a message including the speed setting and the network address over the daisy chained network of control modules. In this manner, the control module for the zone may recognize its network address and receive the command to control its respective zone accordingly, for example by changing the state of an output switch controlling the zone speed to a state indicated by the received command.

In block 1210 the controller may receive a message indicating a network address of an originating control module. For example, the message may be a message including sensor data (e.g., a sensor measurement value) or a sensor status (e.g., "blocked") and may indicate the network address of the control module and/or the sensor that originated the message. In block 1212 the controller may determine the zone identifier for the zone associated with the message based on the originating control module's network address using the translation table. As an example, the controller may match the network address indicated in the received message a network address in the translation table and determine the message is associated with the zone identifier correlated with the matching network address in the translation table. The controller may then route the message to a conveyor control module or application with an indication of the zone identifier, such as the cardinal number identifying the zone where the message originated. In this manner, a conveyor control module or application may use messages from the control modules without having to have knowledge of the network topology or addresses themselves. In an embodiment, the controller may return to block 1204 to continuously use the translation table to send commands and receive messages.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for controlling a conveyor having a plurality of zones each having a control module configured to control a selectable speed of the zone, the method comprising:
   automatically generating, at a controller, a translation table correlating an identifier of each zone of the plurality of zones with a network address of its respective control module;
   receiving, at the controller, a command indicating a speed setting for a first zone of the plurality of zones and the identifier of the first zone;
   using, at the controller, the translation table to determine a network address of a control module of the first zone based on the identifier of the first zone; and
   sending the command indicating the speed setting for the first zone of the plurality of zones from the controller to the determined network address of the control module of the first zone.

2. The method of claim 1, wherein each of the control modules of the plurality of zones are connected in a daisy chain.

3. The method of claim 2, wherein automatically generating, at a controller, a translation table correlating an identifier of each zone of the plurality of zones with a network address of its respective control module comprises:
   receiving, at the controller, a description of a sequence of the control modules and the network addresses of the control modules;
   receiving, at the controller, the identifier of each zone of the plurality of zones; and
   applying, at the controller, network rules and zone rules using the description of the sequence of the control modules, the network addresses of the control modules, and the identifiers of each zone of the plurality of zones to generate a translation table correlating the identifier of each zone of the plurality of zones with the network address of its respective control module.

4. The method of claim 2, wherein automatically generating, at a controller, a translation table correlating an identifier of each zone of the plurality of zones with a network address of its respective control module comprises:
   operating the conveyor to transport an object from a most upstream zone of the plurality of zones to a most downstream zone of the plurality of zones;
   monitoring a sequence of received sensor data at the controller, wherein the sensor data is received from each respective control module as the object is detected in each respective zone of the plurality of zones and includes the respective control module's network address; and
   generating, at the controller, a translation table correlating an identifier of each zone of the plurality of zones with the network address of its respective control module based on the sequence of received sensor data.

5. The method of claim 2, further comprising:
   receiving, at the controller, a message originating from one of the control modules, the message including an indication of the network address of the one of the control modules; and
   using, at the controller, the translation table to determine the zone identifier of the zone associated with the message originating from one of the control modules based on the network address of the one of the control modules.

6. A material handling system, comprising:
   a conveyor having a plurality of zones each having a control module configured to control a selectable speed of the zone; and
   a controller in communication with the control modules of the plurality of zones, the controller including a processor configured with processor-executable instructions to perform operations comprising:
      automatically generating, a translation table correlating an identifier of each zone of the plurality of zones with a network address of its respective control module;
      receiving a command indicating a speed setting for a first zone of the plurality of zones and the identifier of the first zone;
      using the translation table to determine a network address of a control module of the first zone based on the identifier of the first zone; and
      sending the command indicating the speed setting for the first zone of the plurality of zones to the determined network address of the control module of the first zone.

7. The material handling system of claim 6, wherein each of the control modules of the plurality of zones are connected in a daisy chain.

8. The material handling system of claim 7, wherein the processor is configured with processor-executable instructions to perform operations such that automatically generating a translation table correlating an identifier of each zone of the plurality of zones with a network address of its respective control module comprises:
   receiving a description of a sequence of the control modules and the network addresses of the control modules;
   receiving the identifier of each zone of the plurality of zones; and
   applying network rules and zone rules using the description of the sequence of the control modules; the network addresses of the control modules, and the identifiers of each zone of the plurality of zones to generate a translation table correlating the identifier of each zone of the plurality of zones with the network address of its respective control module.

9. The material handling system of claim 7, wherein the processor is configured with processor-executable instructions to perform operations such that automatically generating a translation table correlating an identifier of each zone of the plurality of zones with a network address of its respective control module comprises:

operating the conveyor to transport an object from a most upstream zone of the plurality of zones to a most downstream zone of the plurality of zones;

monitoring a sequence of received sensor data, wherein the sensor data is received from each respective control module as the object is detected in each respective zone of the plurality of zones and includes the respective control module's network address; and generating a translation table correlating an identifier of each zone of the plurality of zones with the network address of its respective control module based on the sequence of received sensor data.

10. The material handling system of claim 7, wherein the processor is configured with processor-executable instructions to perform operations further comprising:

receiving, a message originating from one of the control modules, the message including an indication of the network address of the one of the control modules; and using the translation table to determine the zone identifier of the zone associated with the message originating from one of the control modules based on the network address of the one of the control modules.

11. A non-transitory processor readable medium having stored thereon processor-executable instructions configured to cause a processor to perform operations comprising:

automatically generating a translation table correlating an identifier of each zone of a plurality of zones of a conveyor with a network address of its respective control module, wherein each of the plurality of zones has a control module configured to control a selectable, speed of the zone;

receiving a command indicating a speed setting for a first zone of the plurality of zones and the identifier of the first zone;

using the translation table to determine a network address of a control module of the first zone based on the identifier of the first zone; and sending the command indicating the speed setting for the first zone of the plurality of zones to the determined network address of the control module of the first zone.

12. The non-transitory processor readable medium of claim 11, wherein the stored processor-executable instructions are configured to cause a processor to perform operations such that each of the control modules of the plurality of zones are connected in a daisy chain.

13. The non-transitory processor readable medium of claim 12, wherein the stored processor-executable instructions are configured to cause a processor to perform operations such that automatically generating a translation table correlating an identifier of each zone of the plurality of zones of a conveyor with a network address of its respective control module comprises:

receiving a description of a sequence of the control modules and the network addresses of the control modules;

receiving the identifier of each zone of the plurality of zones; and applying network rules and zone rules using the description of the sequence of the control modules, the network addresses of the control modules, and the identifiers of each zone of the plurality of zones to generate a translation table correlating the identifier of each zone of the plurality of zones with the network address of its respective control module.

14. The non-transitory processor readable medium of claim 12, wherein the stored processor-executable instructions are configured to cause a processor to perform operations such that automatically generating a translation table correlating an identifier of each zone of the plurality of zones of a conveyor with a network address of its respective control module comprises:

operating the conveyor to transport an object from a most upstream zone of the plurality of zones to a most downstream zone of the plurality of zones;

monitoring a sequence of received sensor data, wherein the sensor data is received from each respective control module as the object is detected in each respective zone of the plurality of zones and includes the respective control module's network address; and generating a translation table correlating an identifier of each zone of the plurality of zones with the network address of its respective control module based on the sequence of received sensor data.

15. The non-transitory processor readable medium of claim 12, wherein the stored processor-executable instructions are configured to cause a processor to perform operations further comprising:

receiving a message originating from one of the control modules, the message including an indication of the network address of the one of the control modules; and using the translation table to determine the zone identifier of the zone associated with the message originating from one of the control modules based on the network address of the one of the control modules.

\* \* \* \* \*